United States Patent
Liao

(10) Patent No.: US 11,765,122 B2
(45) Date of Patent: Sep. 19, 2023

(54) INFORMATION SHARING METHOD AND APPARATUS, INFORMATION DISPLAY METHOD AND APPARATUS, AND NON-TRANSITORY COMPUTER-READABLE STORAGE MEDIUM

(71) Applicant: BEIJING BYTEDANCE NETWORK TECHNOLOGY CO., LTD., Beijing (CN)

(72) Inventor: Yudong Liao, Beijing (CN)

(73) Assignee: BEIJING BYTEDANCE NETWORK TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 17/875,817

(22) Filed: Jul. 28, 2022

(65) Prior Publication Data

US 2022/0368666 A1    Nov. 17, 2022

Related U.S. Application Data

(63) Continuation of application No. PCT/CN2021/086062, filed on Apr. 9, 2021.

(30) Foreign Application Priority Data

Apr. 30, 2020  (CN) .......................... 202010366951.6

(51) Int. Cl.
    *H04L 51/42*    (2022.01)
(52) U.S. Cl.
    CPC .................................. *H04L 51/42* (2022.05)

(58) Field of Classification Search
    CPC ........................................................ H04L 51/42
    See application file for complete search history.

(56) References Cited

U.S. PATENT DOCUMENTS 8,020,105 B1 *  9/2011  Lemay .............. H04M 1/72436
                                                    715/752
2005/0021643 A1    1/2005  Watanabe et al.
(Continued)

FOREIGN PATENT DOCUMENTS

CN    104579925 A    4/2015
CN    104753771 A    7/2015
(Continued)

OTHER PUBLICATIONS

CloudHQ. "How to Get an Email Link for a Specific Email in Gmail." YouTube, Mar. 20, 2019, https://www.youtube.com/watch?v=5FXiVPxk0JQ. (Year: 2019).*
(Continued)

*Primary Examiner* — Austin J Moreau
(74) *Attorney, Agent, or Firm* — Faegre Drinker Biddle & Reath LLP

(57) ABSTRACT

Provided are an information sharing method and apparatus, an electronic device, and a non-transitory computer-readable storage medium. The method includes in response to detecting a mail sharing operation triggered by a sharer for a first mail, determining a target mail currently to be shared; and acquiring sharee information and sharing, according to the sharee information, the target mail with a sharee corresponding to the sharee information to display the target mail on a client interface corresponding to the sharee.

28 Claims, 19 Drawing Sheets

(56) References Cited

U.S. PATENT DOCUMENTS

| | | | |
|---|---|---|---|
| 2006/0031331 A1* | 2/2006 | LoBuono | H04L 51/04 709/228 |
| 2011/0202859 A1* | 8/2011 | Fong | G06F 3/04886 715/769 |
| 2013/0151633 A1 | 6/2013 | Hazarika | |
| 2016/0337277 A1* | 11/2016 | Dong | H04L 51/046 |
| 2018/0021695 A1 | 1/2018 | Crosbie et al. | |
| 2018/0026952 A1 | 1/2018 | Crosbie et al. | |
| 2018/0121520 A1 | 5/2018 | Degiere et al. | |
| 2018/0260782 A1 | 9/2018 | Bay et al. | |
| 2018/0285323 A1 | 10/2018 | Rochelle et al. | |
| 2018/0341927 A1* | 11/2018 | Agarwal | H04L 51/234 |

FOREIGN PATENT DOCUMENTS

| | | |
|---|---|---|
| CN | 105099891 A | 11/2015 |
| CN | 108055197 A | 5/2018 |
| CN | 108156070 A | 6/2018 |
| CN | 108306810 A | 7/2018 |
| CN | 108319723 A | 7/2018 |
| CN | 109218165 A | 1/2019 |
| CN | 109462538 A | 3/2019 |
| CN | 110572312 A | 12/2019 |
| CN | 110597774 A | 12/2019 |
| JP | 2006180097 A | 7/2006 |
| JP | 2016212477 A | 12/2016 |
| WO | 2014025809 A1 | 2/2014 |

OTHER PUBLICATIONS

International Search Report dated Jul. 7, 2021 in International Application No. PCT/CN2021/086062.

First Office Action dated Mar. 29, 2022 in Chinese Patent Application No. 202010366968.1 (7 pages) with an English translation (3 pages).

Dongming et al., "Multimedia Document Oriented Cooperative Editing System Key Technology Research," Journal of China Institute of Communications, vol. 20, No. 9, pp. 41-46, 1999, with English abstract.

How can multiple people collaborate online to edit emails efficiently, www.zoho.com.cn/email/ (2 pages) with an English translation (3 pages).

Jiang et al., "Analysis and Design of a Online Collaborative Editing Systems on CSCW," School of Management Science and Engineering, Anhui University of Technology, pp. 490-493, 2011.

European Search Report dated May 9, 2023 in European Application No. 23154050.1 (4 pages).

Notice of Reasons for Refusal dated May 16, 2023 in Japanese Application No. 2022-566014, with English translation (25 pages).

* cited by examiner

| List of existing mails in the inbox | | Preset sharing button |
|---|---|---|
| | Re:123aaabbb | 👤 |
| Search field | Sender: Zhang San <zhangsan@xxx.com> | |
| All mails ▼ | Recipient: Li Si<zlisi@xxx.com>, Me | |
| Inbox | Zhang San 18:14 Re:123aaabbb Hello. | Date: 2020-01-13 18:14 |
| Outbox | | Hello Please verify the information |
| Draft box | Li Si 1-12 123aaabbb X This is brief information of mail content X | |
| Deleted mails | | #The following is the quoted mail information# |
| Spam | Wang San 1-10 1222222 X This is brief information of mail content X | Sender: Li Si<lisi@xxx.com> Recipient: Zhang San<zhangsan@xxx.com>, Me Date: 2020-01-12 11:12 Subject: 123aaabbb |
| | Wang Si 1-7 2222222 X This is brief information of mail content X | X This is mail content information X |
| | Wang Wu 1-6 2222222 X This is brief information of mail content X | |
| | Wang Liu 1-4 2222222 X This is brief information of mail content X | |
| | Wang Qi 1-3 2222222 X This is brief information of mail content X | |

FIG. 5

| Inbox | Search field | Re:123aaabbb |
|---|---|---|
| Outbox | All mails ▼ | Sender: Zhang San <zhangsan@xxx.com> |
| Draft box | Zhang San 18:14<br>Re:123aaabbb<br>Hello | Recipient: Li Si<zlisi@xxx.com>, Me<br><br>Date: 2020-01-13 18:14 |
| Deleted mails | ●Li Si 1-12<br>123aaabbb<br>X This is brief information<br>of mail content X | Hello<br>Please verify the information |
| Spam | Wang San 1-10<br>12222222<br>X This is brief information<br>of mail content X | #The following is the quoted mail information# |
| | Wang Si 1-7<br>2222222<br>X This is brief information<br>of mail content X | Sender: Li Si<lisi@xxx.com><br>Recipient: Zhang San<zhangsan@xxx.com>, Me<br>Date: 2020-01-12 11:12<br>Subject: 123aaabbb |
| | Wang Wu 1-6<br>2222222<br>X This is brief information<br>of mail content X | X This is mail content information X |
| | Wang Liu 1-4<br>2222222<br>X This is brief information<br>of mail content X | |
| | Wang Qi 1-3<br>2222222<br>X This is brief information<br>of mail content X | |

FIG. 6

Mail group list in the inbox →

Preset sharing button →

| | | |
|---|---|---|
| Search field | | 🖉 |
| All mails ▼ | 123aaabbb | |
| Zhang San, Li Si 18:14 [2] | Sender: Zhang San<zhangsan@xxx.com> Date: 2020-01-13 18:14 [Forw-ard] [Reply] | |
| 123aaabbb | Recipient: Li Si<lisi@xxx.com>, Me | |
| Wang San 1-5 [3] | Hello | |
| 12222222 | | |
| Wang Si 1-3 | Sender: Li Si<lisi@xxx.com> Date: 2020-01-12 11:12 [Forw-ard] [Reply] | |
| 2222222 | Recipient: Zhang San<zhangsan@xxx.com>, Me | |
| X This is brief information of mail content X | X This is brief information of mail content X | |
| Wang Wu 1-1 | | |
| 2222222 | | |
| X This is brief information of mail content X | | |

Sidebar: Inbox, Outbox, Draft box, Deleted mails, Spam

FIG. 8

| | ⍟ ☐ ◯ ☒ ⍟ ▽ ⍟ | ★ ⌖ |
|---|---|---|
| Search field | 123aaabbb | |
| All mails ▼ | | |
| Inbox | ★ Zhang San, Li Si 18:14 [2] | Sender: Zhang San<zhangsan@xxx.com> Date: 2020-01-13 18:14 [Forw-ard] [Reply] |
| Outbox | 123aaabbb | Recipient: Li Si<lisi@xxx.com>, Me |
| Draft box | Wang San 1-5 [3] | Hello |
| Deleted mails | 1222222 | |
| Spam | Wang Si 1-3 | Sender: Li Si<lisi@xxx.com> Date: 2020-01-12 11:12 [Forw-ard] [Reply] |
| | 2222222 | Recipient: Zhang San<zhangsan@xxx.com>, Me |
| | X This is brief information of mail content X | X This is brief information of mail content X |
| | Wang Wu 1-1 | |
| | 2222222 | |
| | X This is brief information of mail content X | |

FIG. 10

| | Search field | | |
|---|---|---|---|
| Inbox | All mails ▼ | | 123aaabbb |
| Outbox | Zhang San, Li Si  18:14  2<br>123aaabbb | | Sender: Zhang San<zhangsan@xxx.com> Date: 2020-01-13 18:14  Forw-ard  Reply<br>Recipient: Li Si<lisi@xxx.com>, Me<br><br>Hello |
| Draft box | Wang San  1-5<br>12222222  3 | | |
| Sharing box | Wang Si  1-3<br>2222222<br>X This is brief information<br>of mail content X | | Sender: Li Si<lisi@xxx.com>  Date: 2020-01-12 11:12  Forw-ard  Reply<br>Recipient: Zhang San<zhangsan@xxx.com>, Me<br>X This is brief information of mail content X |
| Deleted mails | | | |
| Spam | Wang Wu  1-1<br>2222222<br>X This is brief information<br>of mail content X | | |

FIG. 15

| Search field | Re:123aaabbb |
|---|---|
| Inbox — All mails ▼ | The sharing of this mail is initiated by Li Si<zlisi@xxx.com> |
| Outbox — Zhang San 18:14 Re:123aaabbb Hello | Sender: Zhang San <zhangsan@xxx.com> Recipient: Li Si<zlisi@xxx.com>, Me Date: 2020-01-13 18:14 |
| Draft box — Li Si 1-12 123aaabbb X This is brief information of mail content X | Hello Please verify the information |
| Deleted mails — Wang San 1-10 12222222 X This is brief information of mail content X | #The following is the quoted mail information# |
| Spam — Wang Si 1-7 2222222 X This is brief information of mail content X | Sender: Li Si<lisi@xxx.com> Recipient: Zhang San<zhangsan@xxx.com>, Me Date: 2020-01-12 11:12 Subject: 123aaabbb |
| Wang Wu 1-6 2222222 X This is brief information of mail content X | X This is mail content information X |
| Wang Liu 1-4 2222222 X This is brief information of mail content X | |
| Wang Qi 1-3 2222222 X This is brief information of mail content X | |

INFORMATION SHARING METHOD AND APPARATUS, INFORMATION DISPLAY METHOD AND APPARATUS, AND NON-TRANSITORY COMPUTER-READABLE STORAGE MEDIUM

CROSS REFERENCE TO RELATED APPLICATIONS

This is continuation of International Patent Application No. PCT/CN2021/086062, filed on Apr. 9, 2021, which is based on and claims priority to Chinese Patent Application No. 202010366951.6 filed with the China National Intellectual Property Administration (CNIPA) on Apr. 30, 2020 and Chinese Patent Application No. 202010366968.1 filed with the CNIPA on Apr. 30, 2020, the disclosures of which are incorporated herein by reference in their entireties.

TECHNICAL FIELD

Embodiments of the present disclosure relate to computer technologies, for example, an information sharing method and apparatus, an information display method and apparatus, and a non-transitory computer-readable storage medium.

BACKGROUND

With the rapid development of computer technologies and increasing requirements of users, the following requirements exist: a user shares mail information with other users so that other users can learn the mail information and have a discussion based on the mail information; and the user displays a mail based on the shared mail information.

SUMMARY

Embodiments of the present disclosure provide an information sharing method and apparatus, and a non-transitory computer-readable storage medium to improve information sharing efficiency.

The embodiments of the present disclosure provide an information display method and apparatus, and a storage medium to enrich display information of a shared mail and improve user experience.

An embodiment of the present disclosure provides an information sharing method. The method includes: in response to detecting a mail sharing operation triggered by a sharer for a first mail, determining a target mail currently to be shared; and acquiring sharee information and sharing the target mail with a sharee corresponding to the sharee information according to the sharee information to display the target mail on a client interface corresponding to the sharee.

An embodiment of the present disclosure provides an information display method. The method includes: in response to receiving a target mail shared by a sharer based on a mail sharing operation, acquiring sharer information of the sharer; and displaying the target mail and the sharer information on a client interface of a sharee.

An embodiment of the present disclosure further provides an information sharing apparatus. The apparatus includes at least one processor, and a memory, which is configured to store at least one program; wherein the at least one program, when executed by the at least one processor, causes the at least one processor to perform: in response to detecting a mail sharing operation triggered by a sharer for a first mail, determining a target mail currently to be shared; and acquiring sharee information and share, according to the sharee information, the target mail with a sharee corresponding to the sharee information to display the target mail on a client interface corresponding to the sharee.

An embodiment of the present disclosure further provides an information display apparatus. The apparatus includes at least one processor, and a memory, which is configured to store at least one program; wherein the at least one program, when executed by the at least one processor, causes the at least one processor to perform: acquiring sharer information in response to receiving a target mail shared by the sharer based on a mail sharing operation; and displaying the target mail and the sharer information on a client interface of a sharee.

An embodiment of the present disclosure further provides a non-transitory computer-readable storage medium storing a computer program, where the computer program, when executed by a processor, causes the processor to perform the information sharing method or the information display method provided in any one of the embodiments of the present disclosure.

BRIEF DESCRIPTION OF DRAWINGS

Same or similar reference numerals in the drawings denote same or similar elements. It is to be understood that the drawings are illustrative and that originals and elements are not necessarily drawn to scale.

FIG. 5 is a display example of a mailbox interface according to embodiment two of the present disclosure;

FIG. 6 is a display example of a sharing success prompt identifier according to embodiment two of the present disclosure;

FIG. 8 is a display example of a mailbox interface according to embodiment three of the present disclosure;

FIG. 10 is a display example of information of an unread message according to embodiment four of the present disclosure;

FIG. 15 is an example of using a sharing box to store shared mails according to embodiment seven of the present disclosure;

FIG. 18 is a display example of sharer information according to embodiment nine of the present disclosure;

FIG. 20 is a display example of an instant messaging (IM) client interface according to embodiment ten of the present disclosure;

DETAILED DESCRIPTION

Figure 1:
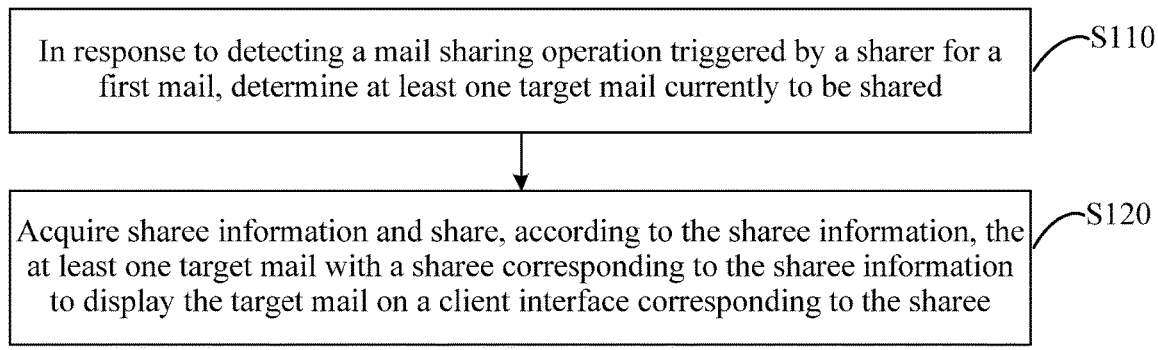
FIG. 1 is a flowchart of an information sharing method according to embodiment one of the present disclosure.

Embodiments of the present disclosure will be described below with reference to the drawings. The drawings illustrate multiple embodiments of the present disclosure, but it is to be understood that the present disclosure may be implemented in various manners and should not be limited to the embodiments set forth herein. These embodiments are provided for an understanding of the present disclosure. The drawings and embodiments of the present disclosure are merely for illustrative purposes and are not intended to limit the scope of the present disclosure.

The various steps recited in the method embodiments of the present disclosure may be performed in a different order and/or in parallel. The method embodiments may include an additional step and/or omit execution of an illustrated step. The scope of the present disclosure is not limited in this respect.

As used herein, the term "include" and variations thereof are intended to be inclusive, that is, "including, but not limited to". The term "based on" is "at least partially based on". The term "one embodiment" means "at least one embodiment"; the term "another embodiment" means "at least one another embodiment"; and the term "some embodiments" means "at least some embodiments". Related definitions of other terms are given in the description hereinafter.

Concepts such as "first" and "second" in the present disclosure are merely intended to distinguish one from another apparatus, module, or unit and are not intended to limit the order or interrelationship of the functions performed by the apparatus, module, or unit.

References to modifications of "one" or "a plurality" mentioned in the present disclosure are intended to be illustrative and not limiting; those skilled in the art should understand that "one" or "a plurality" should be understood as "one or more" unless clearly expressed in the context.

In a process of implementing the present disclosure, the applicant of the present disclosure found that when a user shares a mail with other users, the user shares one mail, that is, only one mail can be shared at a time. If the user wants to share multiple mails, the user needs to search for multiple mails by himself and needs to perform sharing multiple times, which makes a sharing operation cumbersome, reduces the sharing efficiency, and also reduces user experience. In view of this, in technical schemes of the embodiments of the present disclosure, in response to detecting a mail sharing operation triggered by a sharer for a first mail, at least one target mail currently to be shared is determined from a second mail matching the first mail, and according to acquired sharee information, the at least one target mail is shared with a sharee corresponding to the sharee information. In this manner, at least one target mail matching each other may be shared with the sharee at one time without the need for the user to search for associated mails by himself, and there is no need to perform sharing for multiple times, which simplifies a user sharing operation, improves the sharing efficiency, and improves the user experience.

Embodiment One

FIG. 1 is a flowchart of an information sharing method according to embodiment one of the present disclosure. This embodiment is applicable to a case of sharing a mail of one user with other users. The method may be performed by an information sharing apparatus, and the apparatus may be implemented by software and/or hardware and integrated into a mailbox client of a sharer. The mailbox client may be integrated into a personal computer (PC) or a mobile terminal. As shown in FIG. 1, the method includes steps described below.

In S110, in response to detecting a mail sharing operation triggered by a sharer for a first mail, at least one target mail currently to be shared is determined.

In an embodiment, the step in which the target mail currently to be shared is determined includes that the at least one target mail currently to be shared is determined from a second mail matching the first mail, where the second mail includes the first mail and/or other mails.

Figure 2:
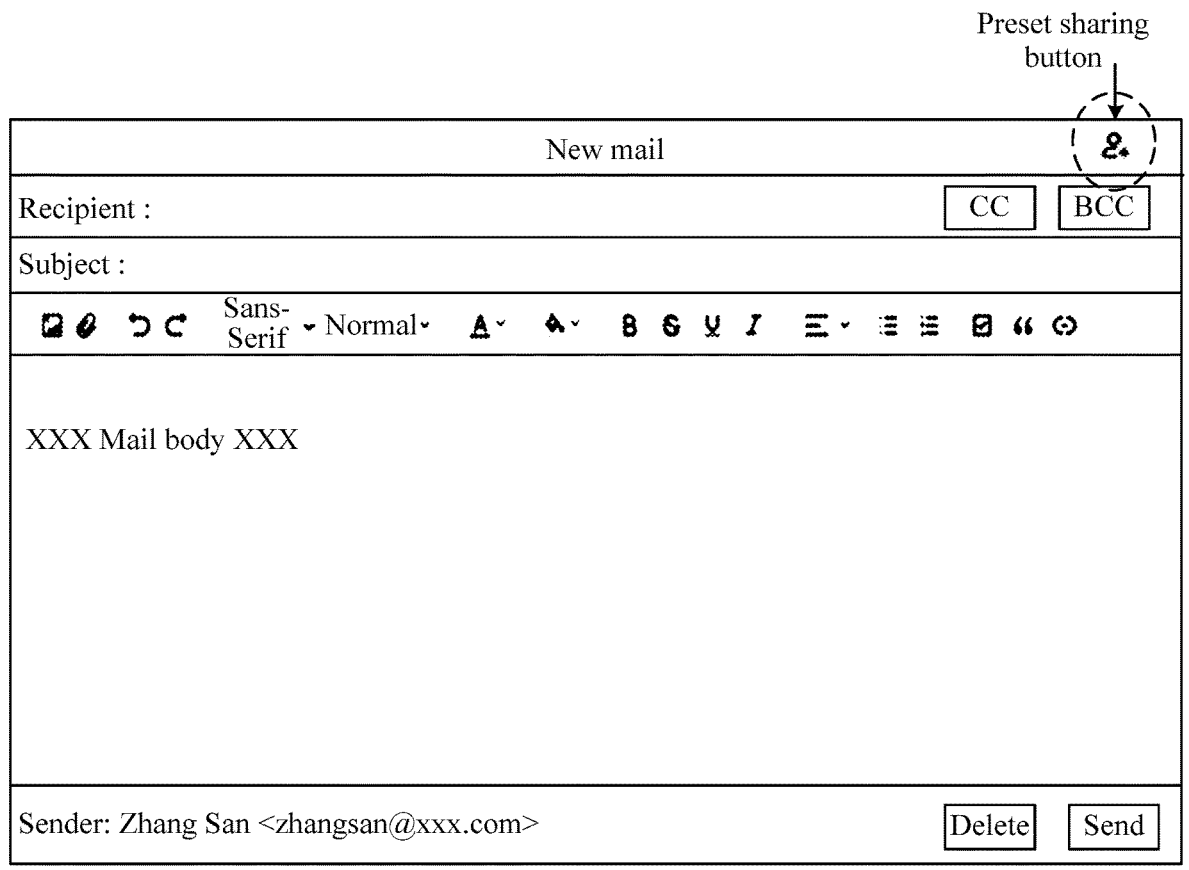
FIG. 2 is an example of a display interface of a mail being edited according to embodiment one of the present disclosure.

The sharer may be a user who desires to perform the mail sharing operation. The first mail may refer to any mail in a current mailbox of the sharer. Exemplarily, the first mail may include a mail being edited, a received mail in an inbox, a sent mail in an outbox, or an edited mail stored in a draft box. The mail being edited may refer to a new editable mail generated by the sharer triggering a mail composing operation. For example, FIG. 2 is an example of a display interface of a mail being edited. The second mail may be a mail that matches the first mail in the current mailbox of the sharer and is determined in advance based on a preset matching condition; or the second mail may be a mail that matches the first mail in the current mailbox of the sharer and is determined in real time based on the preset matching condition. The second mail may include the first mail, that is, the first mail matches the first mail itself; or the second mail may not include the first mail, that is, the second mail includes only other mails matching the first mail. The target mail may refer to a mail currently to be shared filtered from the second mail. One or more target mails may exist, and the number of target mails may be determined based on the number of second mails and/or a preset filtering condition for the second mail.

When the sharer needs to share the first mail and/or other mails matching the first mail, the sharer may trigger the mail sharing operation based on a preset sharing button on a mail display interface of the first mail, for example, the sharer triggers the mail sharing operation by clicking on the preset sharing button on the mail display interface of the first mail. The click operation may be a touch click manner or a mouse click manner. In this embodiment, one preset sharing button may be set on a mail display interface of each first mail so that the mail sharing operation may be triggered for any mail in the current mailbox. The preset sharing button may refer to an entry identifier for sharing a mail and may be set at any position on the mail display interface, and the position of the preset sharing button is not limited in this embodiment. For example, the preset sharing button (shown in a dashed circle in FIG. 2) in a mail being edited in FIG. 2 may be set in an upper right corner of the mail display interface so that the mail being edited may be shared based on the preset sharing button.

When detecting the mail sharing operation triggered for the first mail, a mailbox client of the sharer may acquire the second mail matching the first mail in the current mailbox, for example, acquire and determine a mail with the same subject name as the first mail in the current mailbox as the second mail or determine a mail having a reference relationship with the first mail as the second mail. Based on the preset filtering condition, at least one target mail currently to be shared is determined from the second mail, for example, all mails in the second mail are determined as target mails; or the second mail in a preset period of time for receiving or in a period of time for sending and/or the second mail corresponding to the designated sender and receiver is determined as the target mail so that automatic matching of mails can be achieved without the need for the user to search for associated mails by himself. If no second mail matching the first mail exists in the current mailbox or no target mail satisfying the preset filtering condition exists, prompt information indicating that the mail cannot be shared may be displayed on a current display interface to prompt the user to share other mails or adjust the preset filtering condition.

Figure 3:
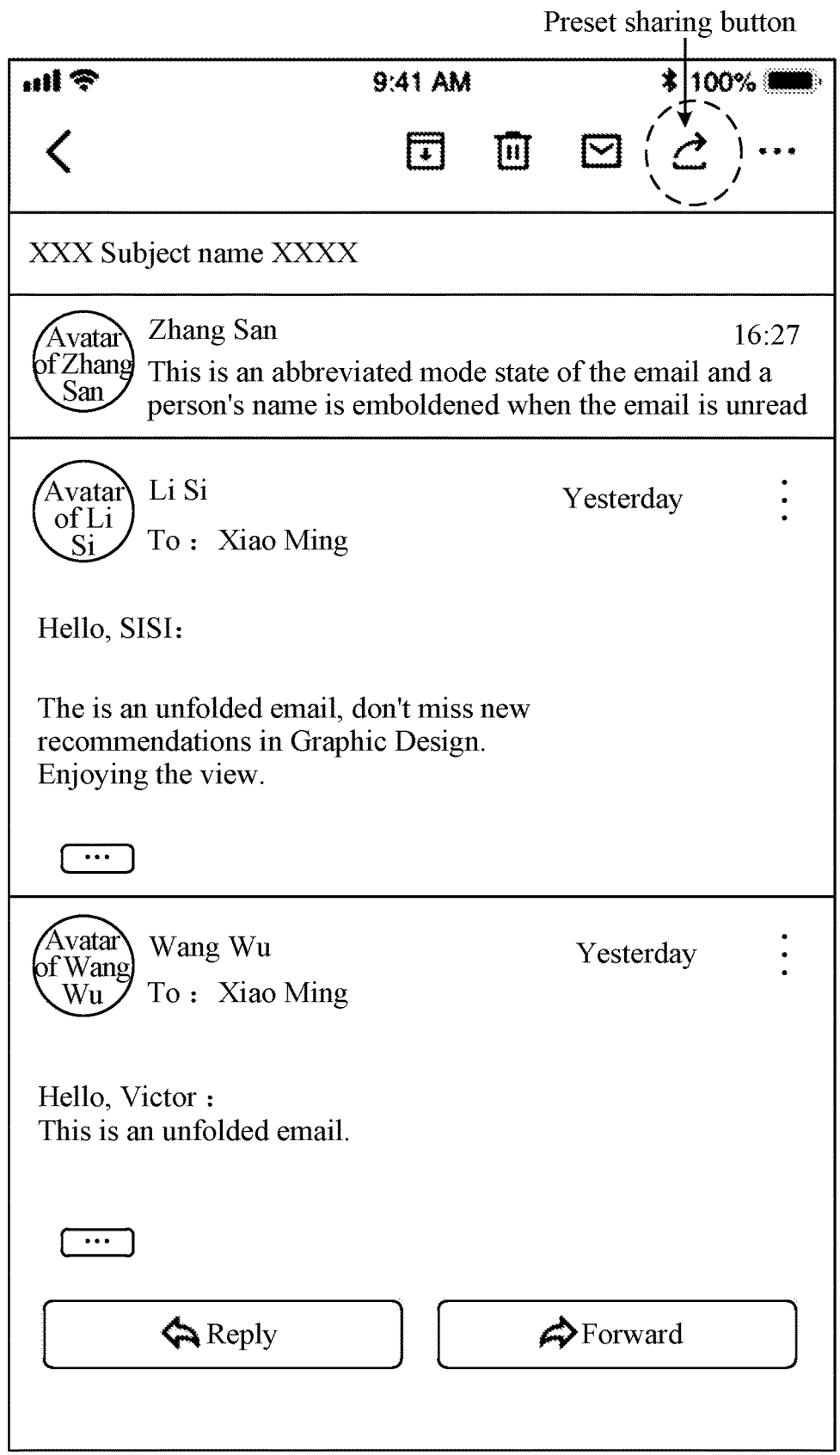
FIG. 3 is a display example of a preset sharing button according to embodiment one of the present disclosure.

Exemplarily, the preset sharing button may be set on the mail display interface of the first mail and/or on a display interface of a mail group including the first mail. For example, if mails in the mailbox are classified and stored in a form of a mail group, the preset sharing button may be set on a display interface of each mail group so that the mail sharing operation may be triggered for each mail group. For example, FIG. 3 is a display example of a preset sharing button. As shown in FIG. 3, three mails with the same subject name are added to the same mail group for display, and the preset sharing button (shown in a dashed circle in FIG. 3) is set at a top of a display interface of the mail group so that the sharer may trigger the mail sharing operation for the mail group. When detecting the mail sharing operation triggered for the mail group including the first mail, the mailbox client of the sharer may determine, based on the mail group, the second mail matching the first mail, for example, determine each mail in the mail group as the second mail matching the first mail.

Since the PC and the mobile terminal have different sizes of display interfaces, the PC and the mobile terminal have different positions where the preset sharing button is set and contents displayed on the mail interface, but the PC and the mobile terminal have the same mail sharing logic and can perform a mail sharing process in the embodiments of the present disclosure.

In S120, sharee information is acquired and the at least one target mail is shared with a sharee corresponding to the sharee information according to the sharee information to display the target mail on a client interface corresponding to the sharee.

The sharee information may include at least one piece of user information and/or at least one piece of user group information. The sharee corresponding to the sharee information may include at least one single user and/or at least one user in a user group. The sharee information may include sharee IM information so that the target mail may be shared with an IM client corresponding to the sharee; or the sharee information may include sharee mailbox information so that the target mail may be shared with a mailbox client corresponding to the sharee. The mailbox client and the IM client of the sharer may be different clients or may be functional modules connected under a same client so that the mailbox client and the IM client may communicate more conveniently.

In response to detecting the mail sharing operation, the mailbox client of the sharer may display a display interface for acquiring the sharee information so that the sharer may manually input the sharee information on the display interface or select, based on displayed multiple pieces of share information, required sharee information so as to acquire the sharee information based on the input operation or the selection operation of the user. According to the sharee information, the at least one target mail may be shared with at least one sharee corresponding to the sharee information, and the target mail is displayed on the client corresponding to the sharee so that at least one target mail matching each other may be shared with the sharee at one time without the need for performing sharing multiple times, which simplifies the user sharing operation and improves a mail sharing efficiency.

Exemplarily, when the target mail is shared with multiple users in the user group, the target mail may be shared on a group session interface of the user group so that each user in the user group may view the shared target mail on the group session interface. In this manner, the sharer and the sharee may communicate on the group session interface for the shared target mail, which improves the user experience.

The target mail shared through the mail sharing operation may be controlled by the sharer. An operation authority of the sharee on the target mail obtained by sharing of the sharer is a temporary authority, and the temporary authority of the sharee on the target mail is limited by an operation triggered by the sharer. For example, based on a sharing end operation triggered by the sharer, the target mail is no longer visible on a shared end. If the target mail is a received mail or a sent mail in the mailbox of the sharer, a sharing operation performed by the sharer on the target mail does not modify mail content of the target mail. That is, no matter what kind of temporary authority the sharer grants to the sharee, the target mail presented on the shared end is at least a part of the target mail determined based on the temporary authority. The sharer may set different mail processing authorities for different sharees. Compared with a mail forwarding operation, a mail forwarded through the mail forwarding operation is actually received by a forwarder and is not controlled by the forwarder, mail content of a mail to be forwarded in the mailbox is modifiable, and different forwarded persons have the same mail processing authority, which makes the mail sharing operation different from the mail forwarding operation.

Exemplarily, the step in which the at least one target mail currently to be shared is determined from the second mail matching the first mail may include that: if the first mail is being edited, the first mail is determined as the target mail currently to be shared; after S120, the method may further include that: in response to detecting an edit operation performed by the sharer on the target mail, the target mail received in a client corresponding to the sharee is updated according to current edited content of the sharer so that the sharee views the current edited content of the sharer based on the updated target mail.

The mailbox client of the sharer may determine a mail being edited as the target mail and share the target mail with the sharee corresponding to the sharee information so that the sharee may view a new mail being edited by the sharer, and thus the sharer and the sharee may edit the mail collaboratively so as to satisfy individual needs of users.

Exemplarily, the step in which in response to detecting the mail sharing operation triggered by the sharer for the first mail, the target mail currently to be shared is determined from the second mail matching the first mail includes in response to detecting a mail sharing operation triggered by the sharer for a target mail group, a mail in the target mail group is determined as the target mail currently to be shared.

Exemplarily, the method further includes that: in response to detecting that a newly-added mail exists in the target mail group, the newly-added mail is shared with the sharee corresponding to the sharee information.

The newly-added mail may be a mail newly added in the target mail group compared to a mail group shared through the last mail group sharing operation.

Exemplarily, after the target mail is shared with the sharee corresponding to the sharee information to display the target mail on the client interface corresponding to the sharee, the method further includes that: a first sharing identifier is displayed, where the first sharing identifier indicates that the target mail group is shared.

Based on the preceding embodiment, a second sharing identifier may be displayed on the client interface of the sharee, where the second sharing identifier is used for characterizing that the target mail is shared from another client, and the second sharing identifier has a different display style from the first sharing identifier displayed by the client of the sharer.

In the technical schemes of the embodiments of the present disclosure, in response to detecting a mail sharing operation triggered by a sharer for a first mail, at least one target mail currently to be shared is determined from a second mail matching the first mail, and according to acquired sharee information, the at least one target mail is shared with the sharee corresponding to the sharee information. In this manner, at least one target mail matching each other may be shared with the sharee at one time without the need for the user to search for associated mails by himself, and there is no need to perform sharing for multiple times, which simplifies the user sharing operation, improves the sharing efficiency, and improves the user experience.

Based on the preceding technical schemes, the step in which the at least one target mail currently to be shared is determined from the second mail matching the first mail may include that: the second mail matching the first mail is displayed on the display interface; and the at least one target mail currently to be shared is determined according to the second mail selected by the sharer on the display interface.

In this embodiment, all second mails matching the first mail may be displayed on the display interface so that the sharer may select, based on needs of the sharer, a mail to be shared from all the displayed second mails, and the at least target mail currently to be shared may be acquired based on the selection operation of the user, thereby improving mail sharing flexibility and satisfying the individual needs of users.

Based on the preceding technical schemes, after S120, the method may further include that: an identity of the share is acquired; and the identity of the sharee is displayed at a preset position on a mail display interface of the target mail in the mailbox client of the sharer.

The identity of the sharee may include avatar identifier and/or account identifier of the sharee. The avatar identifier of the sharee may include, but is not limited to a photo of the sharee and a name of the sharee. The name of the sharee may include, but is not limited to, a full name in Chinese characters, a full name in English, an abbreviation of the name in Chinese characters, or an abbreviation of the name in English. The account identifier of the sharee may include, but is not limited to, an IM account name or a mail account name. The mail account name may be a full mail account name or a mail prefix name. The preset position on the mail display interface of the target mail may be any blank position on the mail display interface of the target mail and may be set in advance based on business requirements. For example, the preset position on the mail display interface of the target mail may be, but is not limited to, an upper right corner of the mail display interface.

When the sharee information obtained in advance includes the identity of the sharee, the identity of the sharee may be acquired based on the sharee information obtained in advance. In the case where the sharee information does not include the identity of the sharee, for example, in the case where sharer information is a name of an IM user group, the mailbox client of the sharer may generate an identify acquisition request based on the name of the IM user group, send the identity acquisition request to an IM server, and obtain an identity of each sharee corresponding to the name of the IM user group according to response information returned by the IM server based on the identity acquisition request. In the mailbox client of the sharer, the identity of each sharee may be displayed at the preset position on the mail display interface of the shared target mail so that the sharer may quickly learn about each sharee with whom the target mail is shared. A client of the sharee may acquire an identity of the sharer and/or the identity of the sharee, and the identity of the sharer and/or the identity of the sharee may be displayed at a preset position of the target mail displayed on the client interface of the sharee so that when the sharee views the target mail, the sharee can quickly know all sharees and/or the sharer sharing the target mail, thereby improving the user experience.

Exemplarily, the step in which the identity of the sharee is displayed on the mail display interface of the target mail in the mailbox client of the sharer may include that: if the number of sharees is less than or equal to a first preset number, identities of all sharees are displayed on the mail display interface of the target mail in the mailbox client of the sharer; and if the number of the sharees is greater than the first preset number, identities of the sharees are displayed on the mail display interface of the target mail in the mailbox client of the sharer based on a preset abbreviated display manner.

The first preset number may refer to a maximum number of first identities of the sharees that can be displayed in the mail display interface of the target mail, and the first preset number may be set based on a size of a blank region in the mail display interface and business requirements.

If it is detected that the number of the sharees is less than or equal to the first preset number, a first identity of each sharee may be displayed on the mail display interface of the target mail so that the sharer may intuitively view, based on the first identity, all users with whom the target mail is shared. If it is detected that the number of the sharees is greater than the first preset number, first identities corresponding to multiple sharees may be abbreviated and displayed based on the preset abbreviated display manner so that the display interface is prevented from being relatively cluttered when the first identities of all the sharees are displayed at the same time, the space for displaying can be saved through the abbreviated display manner, and the mail display interface is more concise. For example, a first abbreviated display identifier is displayed on the mail display interface of the target mail in the mailbox client of the sharer, and if a viewing operation triggered by the sharer for the first abbreviated display identifier is detected, first identities corresponding to at most a second preset number of sharees among the multiple sharees are displayed. Alternatively, a second abbreviated display identifier and first identities corresponding to the first preset number of sharees are displayed on the mail display interface of the target mail in the mailbox client of the sharer, and if a viewing operation triggered by the sharer for the second abbreviated display identifier is detected, first identities corresponding to at most a third preset number of sharees among the remaining sharees are displayed or first identities corresponding to at most the third preset number of sharees among the multiple sharees are displayed. An appropriate display manner may be selected based on the number of the sharees, and first identities corresponding to the multiple sharees are displayed so that the mail display interface is more concise and user viewing experience is improved.

Exemplarily, the step in which the identity of the sharee is displayed on the mail display interface of the target mail in the mailbox client of the sharer may include that: it is detected whether a mail viewing operation triggered by the sharee for the target mail exists; if the mail viewing operation triggered by the sharee for the target mail does not exist, the identity of the sharee is displayed on the mail display interface of the target mail in the mailbox client of the sharer in a first identifier display manner; and if the mail viewing operation triggered by the sharee for the target mail exists, the identity of the sharee is displayed from the first identifier display manner to a second identifier display manner.

The first identifier display manner and the second identifier display manner may refer to two different display manners. For example, the first identifier display manner and the second identifier display manner may be distinguished by different display colors. For example, the first identifier display manner may be a grayscale display manner. The second identifier display manner may be a highlight display manner. For another example, the first identifier display manner may be a display manner in which a preset identifier is added to the first identity, and the second identifier display manner may be a display manner in which no preset identifier is added to the first identity. The preset identifier may be used for characterizing that the sharee does not view a mail.

After the target mail is shared with the sharee corresponding to the sharee information, the mailbox client of the sharer may detect in real time whether a mail viewing operation triggered by each sharee for the target mail exists to determine, based on whether the sharee views the target mail, a display manner of the first identity. For example, in the client of the sharee, the sharee may trigger the mail viewing operation by clicking on the target mail obtained by sharing. In response to detecting the mail viewing operation triggered by the sharee, a mailbox client of the sharee may add viewed information of the target mail to a message queue, and the mailbox client of the sharer may determine, by monitoring the message queue in real time, whether the sharee has viewed the target mail. If the mailbox client of the sharer detects that no mail viewing operation triggered by the sharee exists, it indicates that the sharee has not viewed the target mail and a first identity of the sharee may be displayed on the mail display interface of the target mail in the first identifier display manner. If the mailbox client of the sharer detects that the mail viewing operation triggered by the sharee exists, it indicates that the sharee has viewed the target mail, and the displayed first identity of the sharee may be redisplayed in the second identifier display manner so that the same first identity may be displayed in different identifier display manners, which reminds the sharer of whether the sharee has viewed information of the target mail, thereby improving the user experience.

Based on the preceding technical schemes, after S120, the method may further include that: in response to detecting a sharee adding operation triggered by the sharer on the mail display interface of the target mail, information of a sharee to be added is acquired and at least one target mail is shared with the sharee corresponding to the information of the sharee to be added according to the information of the sharee to be added.

After the target mail is shared with the sharee corresponding to the sharee information for the first time based on the mail sharing operation triggered by the sharer, a sharee may be added continuously. For example, a sharee adding button may be set on the mail display interface of the target mail. The sharer may trigger the sharee adding operation by clicking on the sharee adding button. In response to detecting the sharee adding operation, the mailbox client of the sharer may display the display interface for acquiring the sharee information so that the sharer may manually input the information of the sharee to be added on the display interface or select, based on displayed information of each sharee, the information of the sharee to be added to acquire the information of the sharee to be added based on the input operation or the selection operation of the user. Based on the information of the sharee to be added, the target mail is shared with each sharee to be added so that the sharee may be added multiple times, thereby achieving dynamic addition of the sharee and satisfying requirements of the user.

Based on the preceding technical schemes, the mail content of the target mail displayed on the client interface corresponding to the sharee may include an attachment download link, sender and receiver information, subject information, and text information; and the method may further include that: in response to receiving an attachment download request sent by the client corresponding to the sharee for the attachment download link, performing identity authentication according to requester information in the attachment download request; and in response to detecting that the requester information satisfies a preset download condition, an attachment download operation is allowed.

The attachment download link may refer to a link for downloading an attachment in the target mail. The preset download condition may be a preset condition that a user who is allowed to perform downloading needs to satisfy. For example, the preset download condition may be set to allow all sharees to download the attachment or allow a specified part of sharees to download the attachment.

If the sharee wants to download the attachment in the target mail, the sharee may click on a displayed mail download link so that the client corresponding to the sharee uses, based on the click operation, the sharee information as the requester information to generate the attachment download request and sends the attachment download request to the mailbox client of the sharer.

The mailbox client of the sharer detects whether the requester information in the attachment download request satisfies the preset download condition. For example, the mailbox client of the sharer matches the requester information with preset information of a user who is allowed to perform downloading. If the matching succeeds, it indicates that the requester information satisfies the preset download condition, that is, the user has a download authority, and at this time, the download operation of the sharee is allowed so that the sharee may successfully download the attachment in the target mail. The identity authentication is performed on the download of the attachment in the target mail so that the security of the attachment may be guaranteed.

Based on the preceding technical schemes, the mail content of the target mail displayed on the client interface corresponding to the sharee may further include sharer prompt information, where the sharer prompt information is determined based on identity information of the sharer.

The sharer prompt information may be used for prompting the sharer information of a shared mail received by the sharee. For example, the sharer prompt information may be "The sharing of this mail is initiated by Li Si <lisi@xxx.com>". The sharer prompt information is displayed on the client interface corresponding to the sharee so that the sharee may know more clearly who shared the mail with the sharee, thereby improving the user experience.

Based on the preceding technical schemes, after S120, the method further includes that: in response to detecting a sharing stop operation triggered by the sharer, a mail deletion instruction is sent to the client corresponding to the sharee so that the client corresponding to the sharee deletes the received target mail based on the mail deletion instruction.

The sharer may trigger the sharing stop operation for all sharees so that clients of all the sharees may receive shared mail deletion instructions; the sharer may also trigger the sharing stop operation for some sharees so that some sharees may receive the shared mail deletion instructions. For example, the mailbox client of the sharer may set a stop button on the mail display interface of the shared target mail, where the stop button is used for controlling the stop of sharing. If the sharer does not want to continue sharing the mail, the sharer may click on the stop button and select at least one sharee with whom sharing needs to be stopped so as to trigger a mail stop operation and stop mail sharing with the selected sharee. The client corresponding to the sharee may delete the received target mail according to the mail deletion instruction so that the sharer may control the shared mail in real time, thereby satisfying the requirements of the user.

Embodiment Two

Figure 4:
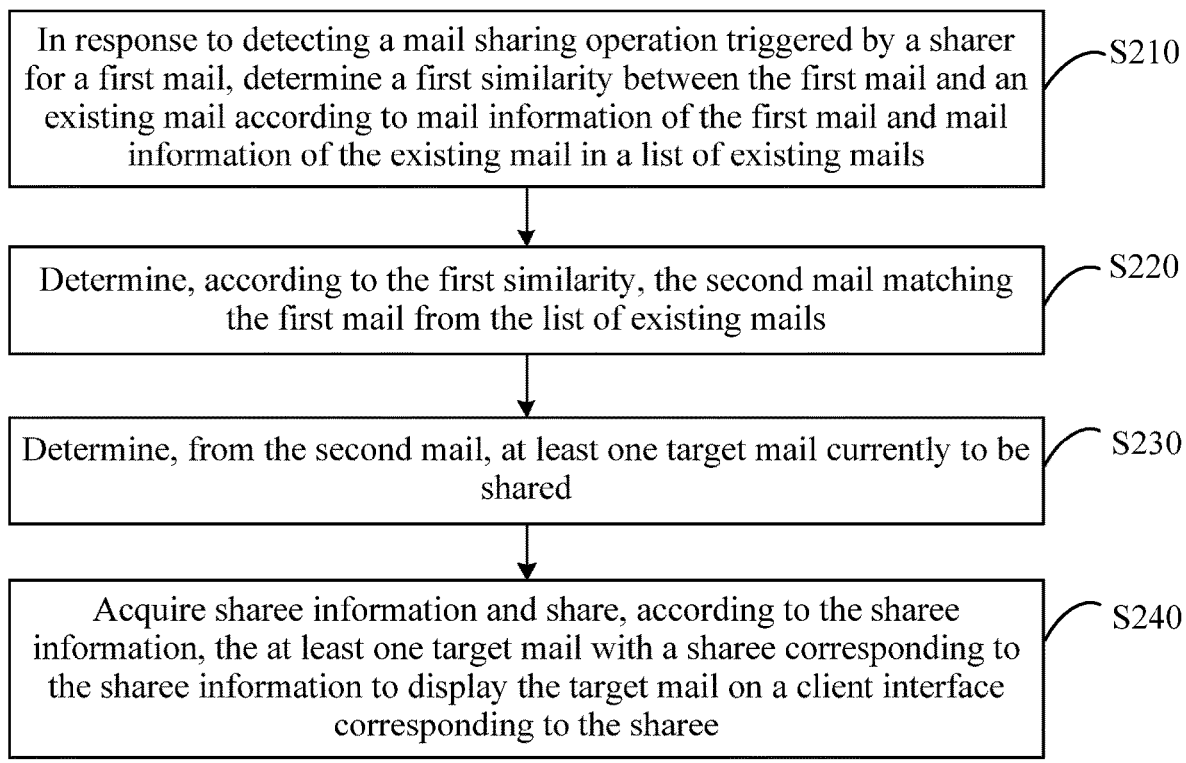
FIG. 4 is a flowchart of an information sharing method according to embodiment two of the present disclosure.

FIG. 4 is a flowchart of an information sharing method according to embodiment two of the present disclosure. This embodiment may be combined with the preceding embodiment, and for a case where a mail is stored separately in a mailbox in a form of a single mail, a real-time matching process of a first mail in a mailbox client is described. Explanations of terms identical to or corresponding to terms in the preceding embodiment are not repeated herein.

Referring to FIG. 4, the information sharing method provided in this embodiment includes steps described below.

In S210, in response to detecting a mail sharing operation triggered by a sharer for a first mail, a first similarity between the first mail and an existing mail is determined according to mail information of the first mail and mail information of the existing mail in a list of existing mails.

The list of existing mails may include multiple mailing lists stored in a current mailbox. Exemplarily, the list of existing mails may include, but is not limited to, a list of received mails in an inbox, a list of sent mails in an outbox, and a list of edited mails in a draft box. Each cell in each list of existing mails is configured to display abbreviated information of each mail in the list, and in response to detecting a click operation on a cell where the abbreviated information is located, detailed information of the mail may be displayed. FIG. 5 is a display example of a mailbox interface.

As shown in FIG. 5, a second column region in the mailbox interface is the list of existing mails in the inbox. The list of existing mails in the inbox may be composed of at least one received mail in the current mailbox, and each cell in the list of existing mails is configured to display abbreviated information of each received mail. For example, received mails with a reference relationship or received mails with the same subject name in FIG. 5 are stored independently in the list of existing mails.

The mail information of the existing mail may include, but is not limited to, mail sending and receiving time, sender and receiver information, subject information, and text information. The mail information of the first mail may include, but is not limited to, mail sending and receiving time, sender and receiver information, subject information, and text information. The first similarity may be used for reflecting a matching degree between the first mail and the existing mail. The higher the first similarity is, the higher the matching degree between the first mail and the existing mail is.

A preset sharing button may be set on a mail display interface corresponding to each mail in each list of existing mails. As shown in FIG. 5, the sharer may click on the preset sharing button (shown in a dashed circle in FIG. 5) on a display interface of a mail sent by Zhang San to trigger the mail sharing operation. When the mail sharing operation is detected, the operation of matching the first mail may be performed in the list of existing mails to which the first mail belongs (for example, in the list of received mails in the inbox), so as to determine a matching second mail in the list of existing mails to which the first mail belongs; or the operation of matching the first mail may be performed in each list of existing mails (for example, in the list of received mails in the inbox, the list of sent mails in the outbox, and the list of edited mails in the draft box), so as to determine the matching second mail in all lists of existing mails, thereby improving a matching range of mails. In this embodiment, based on a preset similarity calculation method, such as a cosine similarity method and a Euclidean distance method, the first similarity between the first mail and each existing mail is determined according to mail information of each existing mail and the mail information of the first mail.

In S220, the second mail matching the first mail is determined from the list of existing mails according to the first similarity.

Based on the first similarity, multiple existing mails may be sorted in descending order, and a first preset number of existing mails after sorted may be determined as second mails matching the first mail; the existing mails with the first similarity higher than a preset similarity may be determined as the second mails matching the first mail; the existing mails with the first similarity higher than the preset similarity may be displayed for the sharer to select based on requirements of the sharer, so as to acquire, based on the selection operation, the second mail matching the first mail, thereby improving the mail sharing flexibility.

In S230, at least one target mail currently to be shared is determined from the second mail.

In S240, sharee information is acquired and the at least one target mail is shared with the sharee corresponding to the sharee information according to the sharee information to display the target mail on a client interface corresponding to the sharee.

In the technical schemes in this embodiment, in response to detecting a mail sharing operation triggered by a sharer for a first mail, a first similarity between the first mail and each existing mail in a list of existing mails is determined, and based on the first similarity, a second mail matching the first mail is determined from the list of existing mails so that automatic real-time matching of mails is achieved without the need for the user to searching for mails by himself, thereby improving the mail sharing efficiency.

Based on the preceding technical schemes, S210 may include that: if the first mail and the existing mail in the list of existing mails have the same subject information and the same sender and receiver information, the first similarity between the first mail and the existing mail is determined as a preset value; and/or if the first mail and the existing mail in the list of existing mails have the same subject information and a reference relationship exists between the existing mail and the first mail, the first similarity between the first mail and the existing mail is determined as the preset value. S220 may include that: the existing mail whose first similarity is the preset value and in the list of existing mails is determined as the second mail matching the first mail.

The sender and receiver information may include recipient information and/or sender information. The subject information may include a subject name. The reference relationship may include a reply reference relationship and/or a forward reference relationship. The reply reference relationship may be determined based on a reply identifier in the subject information.

The reply identifier may be, but is not limited to, "Re" or "Reply". The forward reference relationship may be determined based on a forward identifier in the subject information. The forward identifier may be, but is not limited to, "Fw" or "Forward". The preset value may be a preset similarity value. For example, the preset value may be set to 1.

Whether the first mail and each existing mail in the list of existing mails have the same subject information and whether the existing mail and the first mail have the same sender and receiver information are detected; and if the existing mail and the first mail have the same subject information and the same sender and receiver information, the similarity between the existing mail and the first mail is determined as a preset value so that the matching second mail and the first mail have the same sender and receiver information and the same subject information. Moreover/alternatively, whether the first mail and each existing mail in the list of existing mails have the same subject information and whether a reference relationship exists between the existing mail and the first mail are detected; and if the existing mail and the first mail have the same subject information and the reference relationship exists between the existing mail and the first mail, the similarity between the existing mail and the first mail is determined as the preset value so that the matching second mail and the first mail have the reference relationship and the same subject information, there is a large possibility that the target mail that the sharer wants to share exists in matching second mails, thereby improving the user experience.

Based on the preceding technical schemes, after S240, the method may further include that: a sharing success prompt identifier is displayed at a preset position of a first cell in a mailing list including the target mail, where the first cell is configured to display abbreviated information of the target mail.

The sharing success prompt identifier may be used for prompting the user that the mail is successfully shared. The sharing success prompt identifier may be characterized using special symbols or graphics. For example, FIG. 6 is a display example of a sharing success prompt identifier. In FIG. 6, a black dot is used for characterizing a sharing success prompt identifier. The first cell may be configured to display the abbreviated information of the target mail. The abbreviated information of the target mail may include, but is not limited to, at least one of a recipient, a sender, subject information, or text summary information of the target mail. The preset position of the first cell may refer to any blank position of a target cell. For example, as shown in FIG. 6, a left blank position of the recipient or the sender displayed in the first cell may be used as the preset position where the sharing success prompt identifier is displayed so as to prompt the sharer that the target mail is successfully shared.

Exemplarily, the method may further include that: in response to detecting a mail viewing operation triggered by the sharer for the target mail, the displayed sharing success prompt identifier is deleted.

If the sharer clicks on a cell where the sharing success prompt identifier is displayed, the mailbox client of the sharer may detect the mail viewing action triggered by the sharer, which indicates that the sharer has checked the currently shared target mail and knows information that the target mail has been successfully shared so that the displayed sharing success prompt identifier may be deleted, thereby making the display interface more concise.

Embodiment Three

Figure 7:
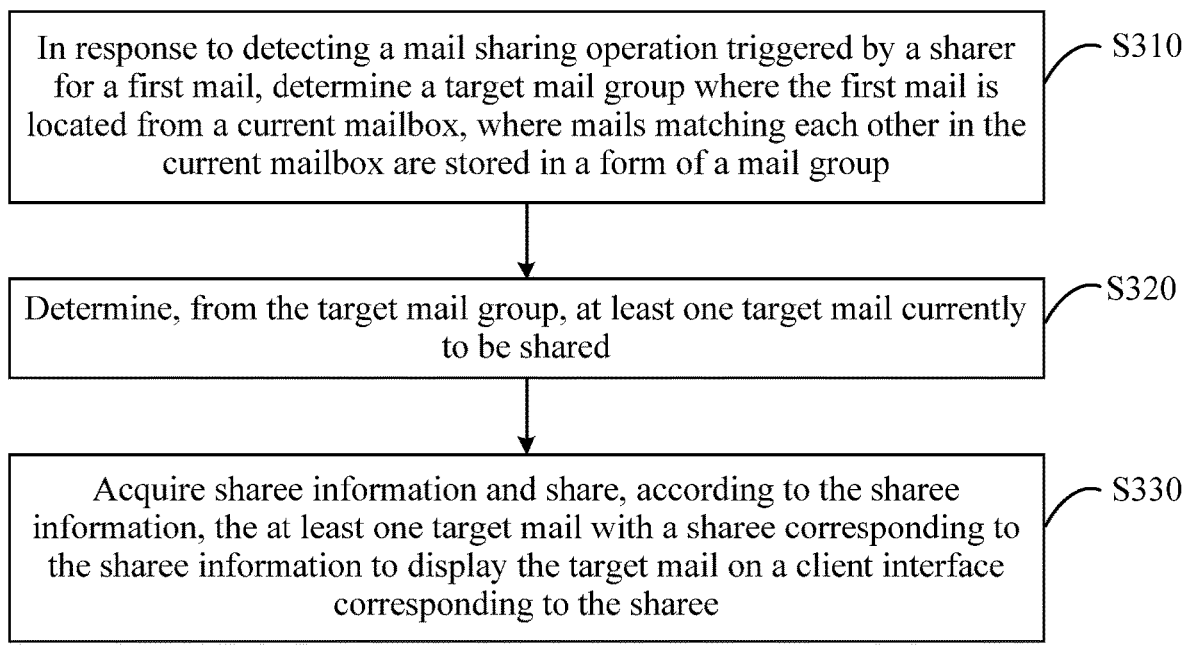
FIG. 7 is a flowchart of an information sharing method according to embodiment three of the present disclosure.

FIG. 7 is a flowchart of an information sharing method according to embodiment three of the present disclosure. This embodiment may be combined with the preceding embodiments, and for a case where mails are classified and stored in a mailbox in a form of a mail group, a pre-matching process of a first mail in a mailbox client is described. Explanations of terms identical to or corresponding to terms in the preceding embodiment are not repeated herein.

Referring to FIG. 7, the information sharing method provided in this embodiment includes steps described below.

In S310, in response to detecting a mail sharing operation triggered by a sharer for a first mail, a target mail group where the first mail is located is determined from a current mailbox, where mails matching each other in the current mailbox are stored in a form of a mail group.

The mail group may refer to a set composed of multiple mails that match each other, or in the case where one mail has no mail that matches it, the one mail is a mail group. The mailbox may include, but is not limited to, a mail group list in an inbox, a mail group list in an outbox, and a mail group list in a draft box. Each cell in the mail group list is configured to display abbreviated information of one mail group, and when a click operation on a cell where the abbreviated information is located is detected, detailed information of each mail included in the mail group may be displayed. Multiple mails in a mail group may be sorted and displayed based on the time when the mail is acquired. For example, based on the time when the mail is acquired, multiple mails in the mail group are sorted in descending order and displayed. FIG. 8 is a display example of a mailbox interface. As shown in FIG. 8, a second column region in the mailbox interface is the mail group list in the inbox. The mail group list in the inbox may include one or more mail groups, each cell in the mail group list is configured to display abbreviated information of one mail group, each mail group is configured to store multiple matching mails, and the number of mails included in the mail group may be displayed in a cell where the mail group is located. For example, in FIG. 8, multiple mails with reference relationships may be stored in one mail group.

Each mail group included in the mail group list in the inbox may be composed of multiple received mails that match each other or may be composed of multiple existing mails that match each other in the current mailbox. The existing mails may include, but are not limited to, received mails, sent mails, and edited mails in the draft box. For example, in the case where the existing mails that match each other are a sent mail, a received mail, and an edited mail, if the most recent mail from the current time is the received mail, a mail group composed of the three mails is stored in the mail group list in the inbox, and an existing mail identifier and an edited mail identifier may be displayed in a cell where the mail group is located to prompt the sharer that the existing mail and the edited mail have stored in the mail group.

The sharer may trigger the mail sharing operation on the mail display interface of the first mail, that is, the mail sharing operation is triggered in a details display interface of the first mail. For example, the sharer clicks on a preset sharing button on the mail display interface of the first mail so that the mail sharing operation is triggered; or the mail sharing operation may be triggered on a mail group display interface where the first mail is located, for example, as shown in FIG. 8, the sharer clicks on the preset sharing button (shown in a dashed circle in FIG. 8) on the mail group display interface where the first mail is located so that the mail sharing operation is triggered. When detecting the mail sharing operation, the mailbox client of the sharer may determine a mail group where the first mail for which the mail sharing operation is triggered is located as a target mail group. For example, when the mail sharing operation is triggered for one mail in one mail group in the inbox, the mail group in the inbox may be determined as the target mail group.

If the sharer triggers the mail sharing operation through the preset sharing button on a mail group display interface of the mail group where the first mail is located, the mail group displayed on the mail group display interface may be directly determined as the target mail group. If the sharer triggers the mail sharing operation through the preset sharing button on an individual mail display interface of the first mail, only one mail group including the first mail exists in the current mailbox, and the mail group is directly determined as the target mail group. When at least two mail groups including the first mail exist in the current mailbox, the mail groups where the currently triggered first mail is located may be determined as the target mail group. For example, if a mail group A in the inbox includes the first mail, a mail group B in the outbox also includes the first mail, and the currently triggered first mail is a received mail, then the mail group A may be determined as the target mail group. It is also feasible that each mail group including the first mail is displayed for the user to select, and a mail group selected by the user is determined as the target mail group, thereby improving the mail sharing flexibility.

Exemplarily, when the first mail targeted by the sharer is a mail being edited, it may be determined that the target mail group where the first mail is located is a mail group composed of all mails currently being edited.

Exemplarily, before S310, the method may further include that: whenever a mail is received, sent, or edited and saved, whether a mail group matching the mail exists in the current mailbox is detected; if the mail group matching the first mail exists in the current mailbox, the mail is stored in the matching mail group; and if no mail group matching the mail exists in the current mailbox, a new mail group is created and the mail is stored in the new mail group so that mails matching each other can be stored in the mailbox in a form of a mail group.

Whenever a mail is received, sent, or edited and saved, matching may be performed in a mail group list to which the mail belongs. For example, if the mail is a received mail, matching is performed in the mail group list in the inbox; if the mail is a sent mail, matching is performed in the mail group list in the outbox; and if the mail is a mail edited and saved, matching is performed is the mail group list in the draft box, so as to determine whether a mail group matching the mail exists in the mail group list to which the mail belongs. Whenever a mail is received, sent, or edited and saved, matching is performed between the mail and each mail group in each mail group list (for example, the mail group list in the inbox, the mail group list in the outbox, and the mail group list in the draft box) in the current mailbox, so as to determine whether a mail group matching the mail exists in each mail group list.

Exemplarily, the step in which whether a mail group matching the mail exists in the current mailbox is detected may include that: a second similarity between the mail and each mail group is determined according to mail information of a preset mail in each mail group in the mail group list and mail information of the mail; and whether the mail group matching the mail exists in the current mailbox is determined according to the second similarity between the mail and each mail group. The mail group list may be the mail group list to which the mail belongs or each mail group list in the current mailbox. The preset mail may refer to a mail located in a mail group and used for characterizing information of the mail group. For example, the most recent mail in the mail group from the current time may be used as the preset mail. Mail information of the preset mail may include, but is not limited to, mail sending and receiving time, sender and receiver information, subject information, and text information. Mail information of a current mail that is currently received, sent, or edited and saved may include, but is not limited to, mail sending and receiving time, sender and receiver information, subject information, and text information. The second similarity may be used for reflecting a matching degree between the mail group and the current mail. In this embodiment, based on a preset similarity calculation method, such as a cosine similarity method and a Euclidean distance method, a similarity between the current mail and each preset mail is determined according to mail information of the current mail and the mail information of the preset mail in each mail group, and the similarity is used as the second similarity between the current mail and a corresponding mail group. If it is detected that a mail group with the second similarity equal to a preset similarity exists, it indicates that a mail group matching the mail exists.

Exemplarily, the step in which whether a mail group matching the mail exists in the current mailbox is detected may include that: when a mail group in the mail group list and the mail have the same subject information and the same sender and receiver information, the mail group is determined as the mail group matching the mail; and/or when the mail group in the mail group list and the mail have the same subject information and a reference relationship exists between a mail in the mail group and the mail, the mail group is determined as the mail group matching the mail. Multiple mails in the current mailbox are classified based on subject information, recipient and sender information, and/or a reference relationship so that multiple mails in the same mail group have the same recipient and sender information and subject information or have the same subject information and a reference relationship exists.

If matching is performed on the mail group list to which the mail belongs, only one mail group matching the mail exists currently, and the mail may be directly stored in a matching mail group at this time. If matching is performed on each mail group list in the current mailbox, when a mail group matching the mail exists in the mail group list to which the mail belongs, the mail is stored in the matching mail group; when the mail group matching the mail does not exist in the mail group list to which the mail belongs, that is, the mail group matching the mail exists in other mail group lists, if only one matching other mail group list exists, the matching mail group in this other mail group list is copied to the mail group list to which the mail belongs, and the mail is added to the mail group copied to the mail group list to which the mail belongs; if at least two matching other mail group lists exist, the matching mail group in specified other mail group lists is copied to the mail group list to which the mail belongs, and the mail is added to the mail group copied to the mail group list to which the mail belongs. If no mail group matching the mail exists in the current mailbox, it indicates that a new category needs to be created. At this time, a new mail group may be created in the mail group list to which the mail belongs, and the mail is stored in the created new mail group, thereby classifying and storing mails in the mailbox.

In S320, at least one target mail currently to be shared is determined from the target mail group.

Each mail in the target mail group may be used as a second mail matching the first mail. At least one mail in the target mail group may be determined as the at least one target mail currently to be shared; mail information of each mail in the target mail group may also be displayed for the user to select a desired matching mail, and the at least one target mail currently to be shared is determined according to the selection operation of the user, thereby improving the mail sharing flexibility.

In S330, sharee information is acquired and the at least one target mail is shared with the sharee corresponding to the sharee information according to the sharee information to display the target mail on a client interface corresponding to the sharee.

In the technical schemes in this embodiment, mails matching each other in a mailbox are stored in a form of a mail group so that a target mail group of a first mail may be directly obtained, that is, at least one second mail matching the first mail is directly obtained, and at least one target mail currently to be shared is determined from the target mail group without the need for real-time matching, thereby improving the mail sharing efficiency.

Based on the preceding technical schemes, after S330, the method may further include that: a sharing success prompt identifier and/or the number of shared mails included in the target mail group is displayed at a preset position of a first cell in a mail group list including the target mail, where the first cell is configured to display abbreviated mail information of one mail group.

The sharing success prompt identifier may be used for prompting the user that the mail is successfully shared. The sharing success prompt identifier may be characterized using special symbols or graphics. The number of shared mails included in the target mail group may refer to the number of target mails currently shared. The number of shared mails is less than or equal to the total number of mails in the target mail group. In the mail group list, the preset position of the first cell may refer to any blank position of the first cell. For example, a left blank position of a recipient or a sender displayed in the first cell may be used as the preset position to display the sharing success prompt identifier and/or the number of shared mails included in the target mail group.

The sharing success prompt identifier and/or the number of shared mails included in the target mail group is displayed at the preset position of the first cell corresponding to the target mail group, thereby reminding the sharer of the successful sharing of the target mail and/or the number of the currently shared target mails in the target mail group.

Exemplarily, the method may further include that: in response to detecting a mail viewing operation triggered by the sharer for the target mail group, the displayed sharing success prompt identifier is deleted.

If the sharer clicks on a cell where the sharing success prompt identifier is displayed, the mailbox client of the sharer may detect the mail viewing action triggered by the sharer, which indicates that the sharer has checked the currently shared target mail group and knows information that the target mail group has been successfully shared so that the displayed sharing success prompt identifier may be deleted, thereby making the display interface more concise.

Exemplarily, when the mails in the target mail group are re-shared, the number of shared mails included in the displayed target mail group may be updated based on the number of the re-shared target mails in the target mail group, so as to display the number of the most recent shared mails in real time.

Based on the preceding technical schemes, after S330, the method may further include that: in response to a storage operation of a new mail in the target mail group, the new mail stored in the target mail group is shared with the sharee corresponding to the sharee information; and in response to a deletion operation of a shared mail in the target mail group, the shared mail in the target mail shared with the share is deleted.

After the mail in the target mail group is shared with the sharee, whether the storage operation of a new mail exists in the target mail group may be detected in real time. If the storage operation of a new mail exists in the target mail group, the shared target mail may be updated automatically based on the current stored new mail so that the currently stored new mail is also shared with the sharee, and the sharee automatically receives a future mail in the target mail group; prompt information that whether a new mail is to be shared may also be displayed on the display interface, and whether the currently stored new mail is shared with the sharee is determined according to a selection operation of the user. In this embodiment, when the shared target mail is updated, only the currently stored new mail may be shared with the sharee, or the currently stored new mail and the target mail shared last time may be shared with the sharee again at the same time so that the sharee may view both the new mail and the target mail shared last time.

After the mail in the target mail group is shared with the sharee, whether the deletion operation of the shared mail in the target mail group exists in the target mail group is detected in real time. If the deletion operation of the shared mail in the target mail group exists in the target mail group, a shared mail deletion instruction may be generated based on a currently deleted shared mail and the shared mail deletion instruction may be sent to the client of the sharee so that when the client of the sharee receives the shared mail deletion instruction, the client of the sharee deletes the shared mail in the target mail shared with the sharee, and the shared mail is updated synchronously in the client of the sharee.

Embodiment Four

Figure 9:
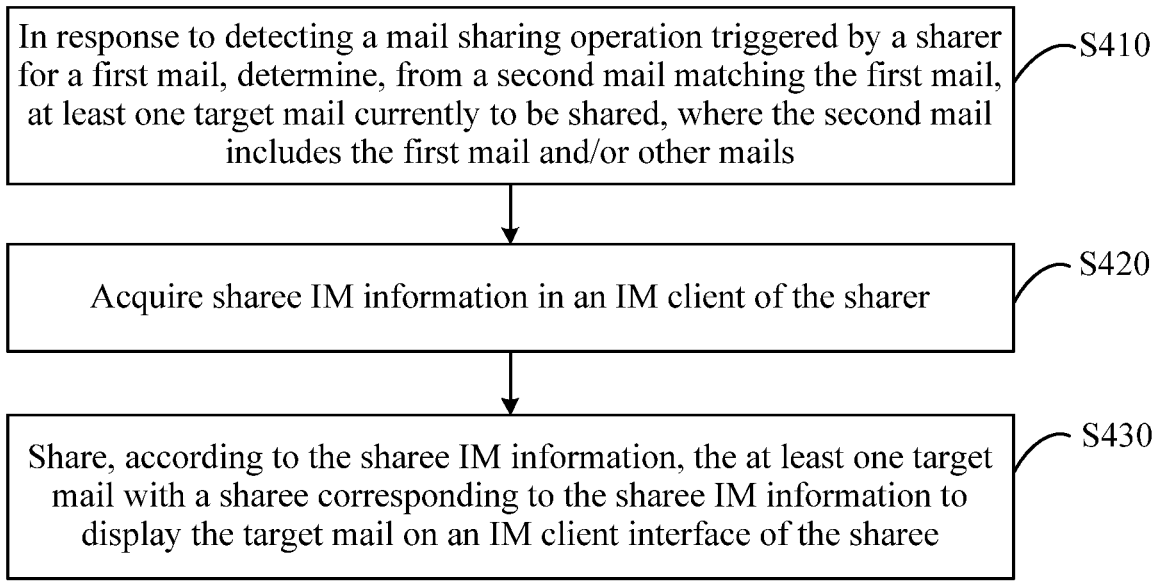
FIG. 9 is a flowchart of an information sharing method according to embodiment four of the present disclosure.

FIG. 9 is a flowchart of an information sharing method according to embodiment four of the present disclosure. This embodiment may be combined with the preceding embodiments, and a mail sharing process when a mail is shared with the IM client of the sharee is described. Explanations of terms identical to or corresponding to terms in the preceding embodiment are not repeated herein.

Referring to FIG. 9, the information sharing method provided in this embodiment includes steps described below.

In S410, in response to detecting a mail sharing operation triggered by a sharer for a first mail, at least one target mail currently to be shared is determined from a second mail matching the first mail, where the second mail includes the first mail and/or other mails.

In S420, sharee IM information in an IM client of the sharer is acquired.

The sharee IM information in the IM client of the sharer may include information of one or more IM users and/or information of one or more IM user groups. The IM user may refer to any friend in the IM client of the sharer. The IM user group may refer to any communication group that has been created in the IM client of the sharer so that multiple users in the IM user group may communicate on a group session interface. The information of the IM user may include, but is not limited to, an IM user name. The information of the IM user group may include, but is not limited to, an IM user group name.

In response to detecting the mail sharing operation triggered by the sharer, a display interface including an input box may be displayed in the mailbox client of the sharer so that the sharer may manually input sharee information in the input box; or information of each IM user and information of each IM user group in the IM client of the sharer may be acquired and displayed on the display interface so that the sharer performs selection based on requirements of the share and obtains sharee IM information according to the selection operation of the sharer.

In S430, the at least one target mail is shared with the sharee corresponding to the IM sharee information according to the sharee IM information, to display the target mail on an IM client interface of the sharee.

When the sharee IM information includes the information of the IM user, the at least one target mail may be shared with the IM user corresponding to the information of the IM user so as to display the target mail on an IM client interface of the IM user. When the sharee IM information includes the information of the IM user group, the at least one target mail may be shared with each IM user in the IM user group corresponding to the information of the IM user group so that all IM users in the IM user group may view the shared mail.

In the technical schemes in this embodiment, at least one target mail is shared with the sharee corresponding to the sharee IM information at one time according to the sharee IM information in the IM client of the sharer so that the mail may be shared from a mailbox terminal to an IM terminal, and sharing does not need to be performed for multiple times when multiple mails are shared, thereby simplifying the mail sharing operation and improving the mail sharing efficiency.

Based on the preceding technical schemes, after S430, the method may further include that: state information of a target message in an IM session is acquired, where the target message includes a message sent by the sharer for the target mail or a message sent by the sharee for the target mail; and based on the state information of the target message, the state information is displayed on a mailbox client interface of the sharer and/or a mailbox client interface of the sharee.

The IM session may refer to a session that includes the sharer or the sharee and in which information of the target mail is shared so that the sharer or the sharee may send a session message for the target mail in the IM session for communication and discussion. If the sharer shares the target mail with the IM user group, the IM session may refer to a group session corresponding to the IM user group. If the sharer shares the target mail with a single IM user, the IM session may refer to a separate session formed by the single IM user and the sharer. The IM session may refer to an IM session located in the IM client or may refer to an IM session embedded in the mailbox client. The IM session located in the IM client and the IM session embedded in the mailbox client may refer to different IM sessions or the same IM session so that through synchronous display, the user sends and views the session message in both the IM client and the mailbox client. The state information of the target message may include, but is not limited to, an unread message identifier and a message importance level identifier.

If an information sender of the sharer and the sharee sends the target message for the target mail in the IM session, an IM server may determine the state information of the target message and add the state information of the target message to a message queue, an information receiver of the sharer and the sharee may obtain the state information of the target message by subscribing to the message queue, and the state information is displayed on the mailbox client interface of the sharer and/or the mailbox client interface of the sharee. For example, if @ for the information receiver is added when the information sender sends the target message, it indicates that the target message is rather important to the information receiver, and the message importance level identifier, such as @ identifier, may be displayed on a mailbox client interface of the information receiver. A sharer terminal or a sharee terminal may also determine a proportion of users who currently read the target message and may display the proportion of users on the mail display interface so as to remind the user of a current situation of reading the target message.

Exemplarily, the step in which the state information of the target message in the IM session is acquired includes that: information of an unread message is acquired based on whether the target message in the IM session is read by an information receiver; the step in which the state information is displayed on the mailbox client interface of the sharer and/or the mailbox client interface of the sharee based on the state information of the target message includes that: the information of the unread message is displayed on the mailbox client interface of the sharer and/or the mailbox client interface of the sharee.

The unread message may refer to the session message in the IM session that is sent by the information sender and has not been read by the information receiver. The information of the unread message may include an unread message prompt icon and/or the number of unread messages. The unread message prompt icon may be characterized using special symbols or graphics. For example, FIG. 10 is a display example of information of an unread message. In FIG. 10, the unread message prompt icon, a five-pointed star, is used for characterizing the information of the unread message.

As shown in FIG. 10, the information of the unread message may be displayed at a preset position of a first cell in a mailing list including the target mail and/or at a preset position on the mail display interface of the target mail, thereby prompting the sharer that the unread message currently exists or reminding the sharer of the number of unread messages at the preset position of the first cell in the mailing list including the target mail and/or at the preset position on the mail display interface of the target mail In this manner, the sharer can view the unread messages in the IM client of the sharer in time. The mail display interface of the target mail may refer to a mail details interface displayed after the first cell corresponding to the target mail is clicked. The preset position on the mail display interface of the target mail may refer to any blank position on the mail display interface, such as a top blank position on the mail display interface in FIG. 10.

Exemplarily, the sharer may click on the information of the unread message displayed at the preset position on the mail display interface of the target mail so as to trigger an unread message viewing operation. If the mailbox client of the sharer detects the unread message viewing operation, the mailbox client of the sharer may automatically jump to the IM client of the sharer and automatically display a session interface including the unread message, thereby simplifying the unread message viewing operation, improving an unread message viewing efficiency, and improving the user experience.

Based on the preceding technical schemes, the method may further include that: sharee mailbox information is acquired; and at least one target mail is shared with a mailbox client of a sharee according to the sharee mailbox information to display the target mail on the mailbox client interface of the sharee.

The sharee mailbox information may include, but is not limited to, a mail account of a sharee. A mapping relationship between each piece of IM information and the mailbox information may be pre-stored in the mailbox client of the sharer so that the sharee mailbox information may be determined according to the mapping relationship and the sharee IM information. When the mapping relationship is not stored in the mailbox client of the sharer, a mailbox information acquisition request is generated based on the sharee IM information and sent to the IM server, and the sharee mailbox information is obtained according to response information returned by the IM server based on the mailbox information acquisition request. Based on sharee mailbox information of each sharee, at least one target mail is shared with the mailbox client of the sharee so that each sharee may also view the shared target mail from the mailbox client.

Exemplarily, if the sharee IM information includes the IM user group name, mailbox information of each IM user in an IM user group corresponding to the IM user group name is acquired and used as the sharee mailbox information so that at least one target mail is shared with a mailbox client of each IM user in the IM user group, and each IM user in the IM user group may view the mail shared by the sharer in a respective mailbox client.

Exemplarily, S430 may include that: according to the sharee IM information, a sharing mail prompt message is sent to an IM client of the sharee so that the sharee views the target mail in the mailbox client of the sharee based on the sharing mail prompt message.

The sharing mail prompt message may refer to a message used for prompting the sharee that the shared mail is currently received. If at least one target mail is sent to the mailbox client of the sharee according to the sharee mailbox information, only the sharing mail prompt message may be sent to the IM client of the sharee according to the sharee IM information, and the target mail does not need to be shared with the IM client of the sharee. In this manner, the sharee may manually open the mailbox client of the sharee to view the target mail based on the sharing mail prompt message, or the sharing mail prompt message is clicked so that the mailbox client of the sharee may be automatically opened and display the target mail, so as to improve a target mail viewing efficiency. In this embodiment, the sharing mail prompt message may be added to a feed information stream in the IM client of the sharee, so as to quickly notify the sharee in a manner of the feed information stream, thereby improving the notification efficiency.

Embodiment Five

Figure 11:
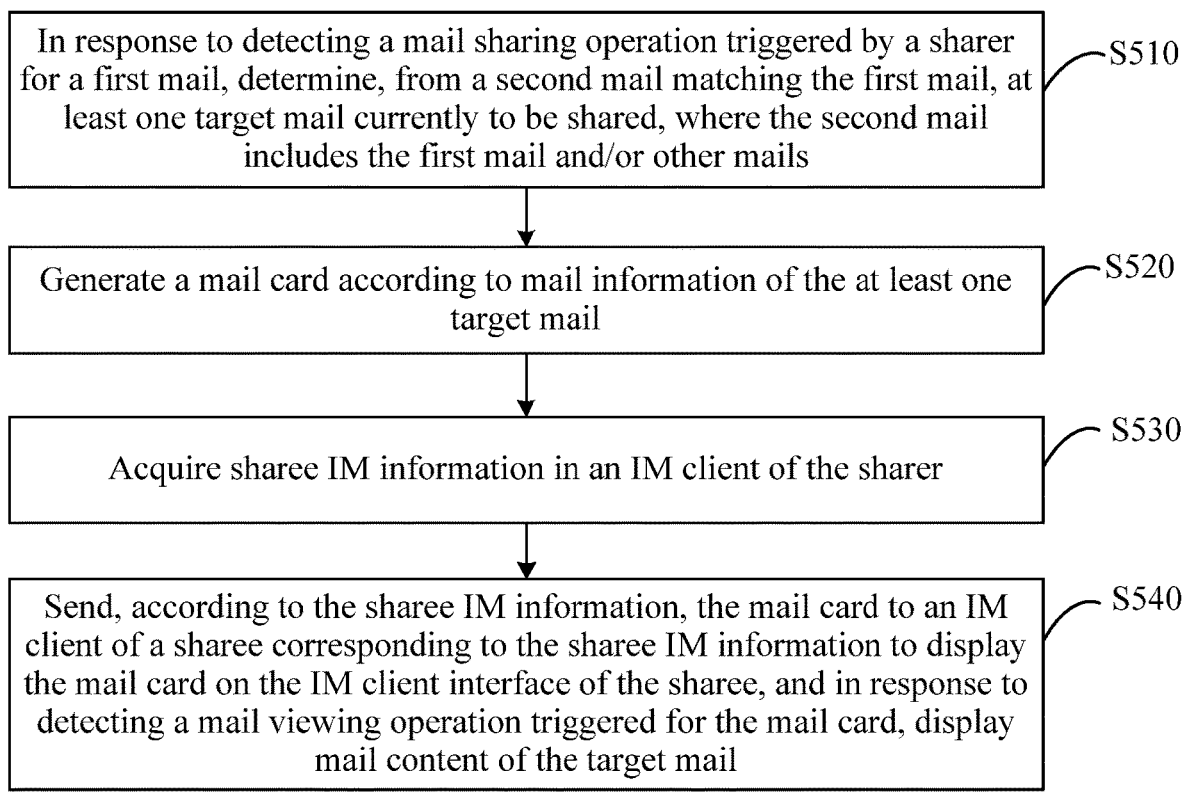
FIG. 11 is a flowchart of an information sharing method according to embodiment five of the present disclosure.

FIG. 11 is a flowchart of an information sharing method according to embodiment five of the present disclosure. This embodiment may be combined with the preceding embodiments, and a display manner of a target mail received by an IM client of a sharee is described. Explanations of terms identical to or corresponding to terms in the preceding embodiment are not repeated herein.

Referring to FIG. 11, the information sharing method provided in this embodiment includes steps described below.

In S510, in response to detecting a mail sharing operation triggered by a sharer for a first mail, at least one target mail currently to be shared is determined from a second mail matching the first mail, where the second mail includes the first mail and/or other mails.

In S520, a mail card is generated according to mail information of the at least one target mail.

The mail information of each target mail may include, but is not limited to, sender and receiver information, subject information, text information, and an attachment download link. The mail card may be a viewing portal for viewing mail information in the IM client.

Figure 12:
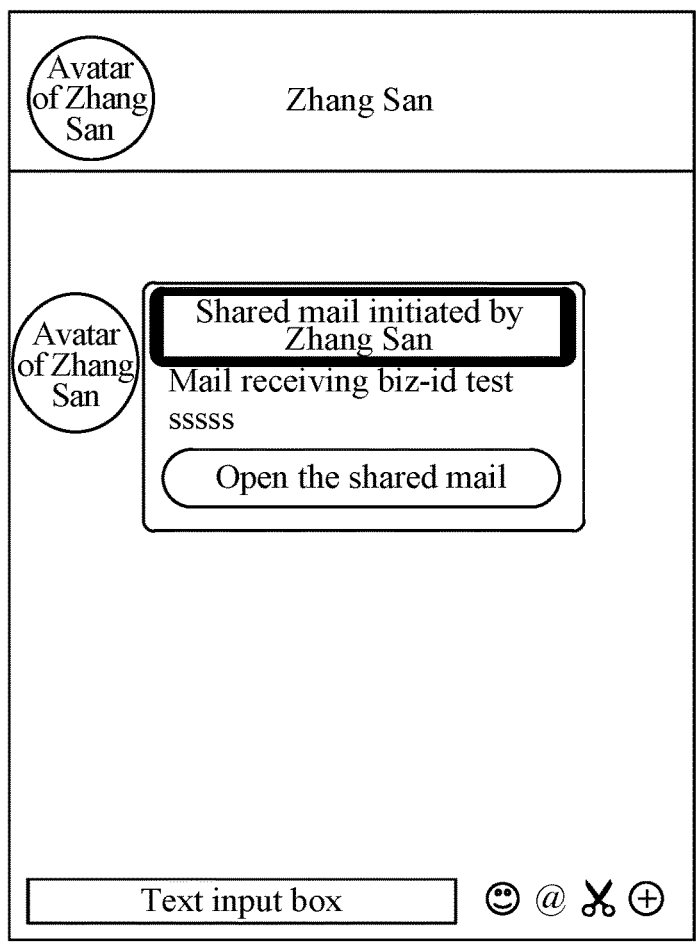
FIG. 12 is a display example of a mail card according to embodiment five of the present disclosure.

Based on a preset display manner, information of multiple target mails may be integrated so that the mail card is generated and displays mail information of the target mail in the preset display manner. Card display content of the mail card may include, but is not limited to, at least one of sharer information, subject information, text information, or an attachment download link, so as to briefly remind the sharee of mail content of a received shared mail. For example, FIG. 12 is a display example of a mail card. As shown in FIG. 12, card content of the mail card may include information of a sharer (Zhang San), subject information (a mail receiving biz-id test), and summary information (sssss) in the text information.

In S530, sharee IM information in an IM client of the sharer is acquired.

In S540, according to the sharee IM information, the mail card is sent to an IM client of a sharee corresponding to the sharee IM information to display the mail card on the IM client interface of the sharee, and in response to detecting a mail viewing operation triggered for the mail card, mail content of the target mail is displayed.

The mail viewing operation may be triggered by the sharee clicking on the mail card. For example, the sharee clicks on an "Open the Shared Mail" button on the mail card in FIG. 12 to trigger the mail viewing operation. The card display content of the mail card includes at least one of subject information of the target mail, text summary information of the target mail, or sharer information of the sharer.

The mailbox client of the sharer may directly send the mail card to the IM client of the sharee or the IM client of the sharer may send the mail card to the IM client of the sharee so that the mail card is displayed in an IM dialog window in the IM client of the sharee. For example, in FIG. 12, in the IM dialog window with the sharer Zhang San, the mail card shared by Zhang San is displayed. When detecting the mail viewing operation triggered by the sharee for the mail card, the IM client of the sharee may display the mail content of the target mail based on the preset display manner corresponding to the mail card. For example, when the mail viewing operation is detected, detailed information of each target mail is displayed in a form of a list, that is, each cell of the list displays detailed information of a respective target mail so that the sharee views each target mail on the display interface.

Exemplarily, when detecting a sharing stop instruction triggered by the sharer, the mailbox client of the sharer may send a mail deletion instruction to the IM client of the sharee. In this manner, the IM client of the sharee deletes the mail card based on the mail deletion instruction so that the currently shared target mail is deleted, and the sharer can control the shared mail in real time.

In the technical schemes in this embodiment, the mail card is sent to the IM client of the sharee corresponding to the sharee IM information so that when the IM client of the sharee detects the mail viewing operation triggered for the mail card, the IM client of the sharee displays the mail content of the target mail, and the shared mail can be viewed in the IM client.

Based on the preceding technical schemes, "the mail content of the target mail is displayed" in S540 may include that: abbreviated information of the target mail is displayed in a form of a list, and in response to detecting a details viewing operation triggered for the abbreviated information, detailed information of the target mail is displayed.

The abbreviated information of the target mail may include, but is not limited to, sender and receiver information, subject information, and text summary information of the target mail. The text summary information may refer to content of a first preset number of characters in the text information.

In response to detecting the mail viewing operation, the abbreviated information of each target mail may be displayed in a form of a list, that is, each cell in the list is configured to display the abbreviated information of one target mail so that in the case where the number of target mails is relatively large, information of a relatively large number of target mails may be displayed in a limited display region, thereby improving the viewing experience. If the sharee wants to view the detailed information of one target mail in the displayed abbreviated information list, the sharee may click on a cell where the abbreviated information of the target mail is located to trigger the details viewing operation. In this manner, in response to detecting the triggered details viewing operation, the cell may be extended so that the detailed information of the target mail can be displayed in the cell; it is also feasible that a new display window may be created, and the detailed information of the target mail is displayed in the created display window.

Exemplarily, if only one target mail exists, the detailed information of the target mail may be directly displayed; and if at least two target mails exist, the abbreviated information of each target mail may be displayed in a form of a list, and when the details viewing operation triggered for the cell where the abbreviated information is located is detected, the detailed information of a corresponding target mail is displayed.

Based on the preceding technical schemes, "the mail content of the target mail is displayed" in S540 may further include that: a mail display window that is displayed on a same screen as an IM dialog window is created and the mail content of the target mail is displayed in the mail display window.

In response to detecting the mail viewing operation, a display window that is displayed side by side with the IM dialog window may be created, and the mail content of the target mail may be displayed in the created display window. In this manner, the IM dialog window and a window where the mail content is displayed may be displayed on the display interface at the same time so that the sharee may view display content in two windows at the same time, and thus the sharee communicates with the sharer in the IM dialog window based on the displayed mail content, thereby improving the user experience.

Based on the preceding technical schemes, after S540, the method may further include that: when detecting a message forwarding operation triggered by the sharer for the mail card in the session interface, the IM client of the sharer sends the mail card to an IM user and/or an IM user group selected by the sharer.

After the sharer sends the mail card to the IM client corresponding to the sharee, the sent mail card may also exist in the IM client of the sharer so that in the IM client of the sharer, the sharer may trigger the message forwarding operation for the mail card, which is similar to an IM message forwarding operation in which the mail card continues to be shared with the IM user and/or the IM user group selected by the sharer. In this manner, the share is added in the manner of the mail card being forwarded, thereby simplifying an operation of adding the sharee and improving the user experience.

Embodiment Six

Figure 13:
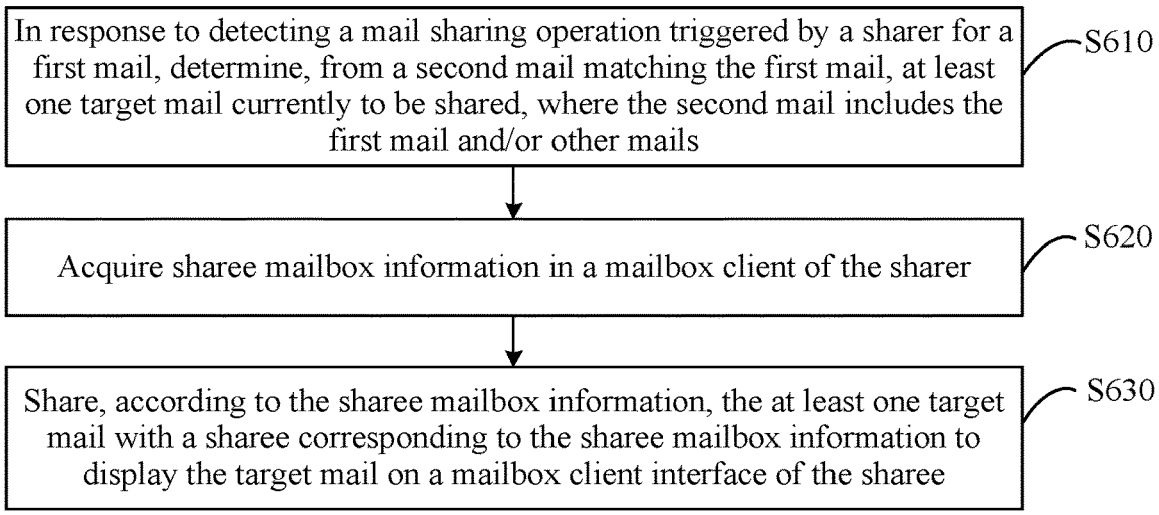
FIG. 13 is a flowchart of an information sharing method according to embodiment six of the present disclosure.

FIG. 13 is a flowchart of an information sharing method according to embodiment six of the present disclosure. This embodiment may be combined with the preceding embodiments, and a mail sharing process when a mail is shared with a mailbox client of a sharee is described. Explanations of terms identical to or corresponding to terms in the preceding embodiment are not repeated herein.

Referring to FIG. 13, the information sharing method provided in this embodiment includes steps described below.

In S610, in response to detecting a mail sharing operation triggered by a sharer for a first mail, at least one target mail currently to be shared is determined from a second mail matching the first mail, where the second mail includes the first mail and/or other mails.

In S620, sharee mailbox information in a mailbox client of the sharer is acquired.

The sharee mailbox information may include information of one or more mailbox users and/or information of one or more mailbox user groups. The mailbox user group may refer to a set that is created by the sharer and composed of at least one mailbox user so that batch sharing may be performed based on the mailbox user group. The information of the mailbox user may include, but is not limited to, a mailbox name. The information of the mailbox user group may include, but is not limited to, a mailbox group name.

In response to detecting the mail sharing operation triggered by the sharer, information of multiple mailbox users and information of multiple mailbox user groups in the mailbox client of the sharer may be displayed on the display interface, and the sharee mailbox information is obtained according to an operation that the sharer selects the displayed information of multiple mailbox users and information of multiple mailbox user groups. It is also feasible that the sharee mailbox information is obtained based on mailbox information manually inputted in a preset input box by the sharer.

In S630, according to the sharee mailbox information, the at least one target mail is shared with the sharee corresponding to the sharee mailbox information to display the target mail on a mailbox client interface of the sharee.

When the sharee mailbox information includes the information of the mailbox user, the at least one target mail may be shared with the mailbox user corresponding to the information of the mailbox user to display the target mail on a mailbox client interface of the mailbox user. When the sharee mailbox information includes the information of the mailbox user group, the at least one target mail may be shared with each mailbox user corresponding to the information of the mailbox user group. In this manner, the target mail is displayed on a client interface of each mailbox user in the mailbox user group so that batch sharing can be achieved by using the information of the mailbox user group, to avoid selecting or inputting information of each mailbox user in the mailbox user group one by one, thereby improving the user experience.

In the technical schemes in this embodiment, at least one target mail is shared with the sharee corresponding to the sharee mailbox information at one time according to the sharee mailbox information in the mailbox client of the sharer so that the mail can be shared from a mailbox terminal to a mailbox terminal, and sharing does not need to be performed for multiple times when multiple mails are shared, thereby simplifying the mail sharing operation and improving the mail sharing efficiency.

Based on the preceding technical schemes, after S630, the method may further include that the mailbox client of the sharer displays a first preset sharing identifier at a preset position of a first cell in a mailing list including the target mail, where the first cell is configured to display abbreviated information of the target mail; and a mailbox client of the sharee displays a second preset sharing identifier at a preset position of a second cell in the mailing list including the received target mail, where the second cell is configured to display the abbreviated information of the received target mail.

The mailing list may be the list of existing mails involved in embodiment two or the mail group list involved in embodiment three. The first preset sharing identifier may be used for indicating that the target mail is a mail shared by the sharer himself. The second preset sharing identifier may be used for indicating that the target mail is an obtained mail shared by others. Exemplarily, the first preset sharing identifier may be characterized by a highlighted icon; and the second preset sharing identifier may be characterized by a grayscale icon.

After the mailbox client of the sharer shares the target mail with the mailbox client of the sharee, the mailbox client of the sharer may display the first preset sharing identifier at the preset position of the cell where the target mail in the mailing list is located so as to indicate that the target mail is a mail shared by the sharer himself. The mailbox client of the sharee displays the second preset sharing identifier at the preset position of the cell where the received target mail in the mailing list is located so as to indicate that the target mail is an obtained mail shared by others. In this manner, the sharee can more clearly and intuitively distinguish the actively-shared sharing mail from the passively-received sharing mail, thereby improving the user experience.

Embodiment Seven

Figure 14:
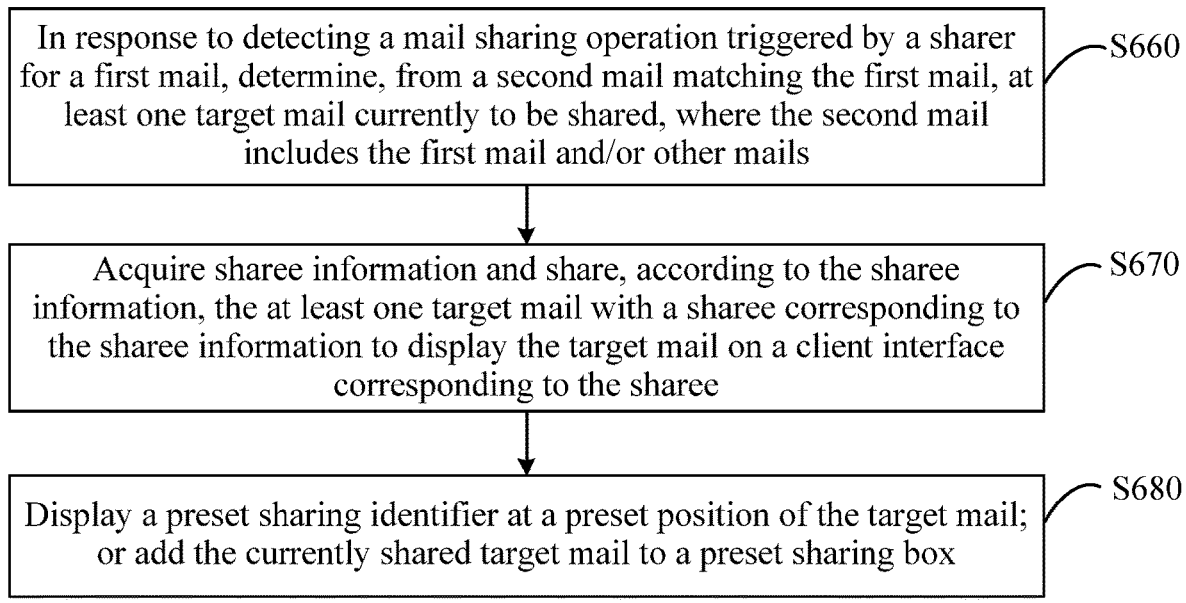
FIG. 14 is a flowchart of an information sharing method according to embodiment seven of the present disclosure.

FIG. 14 is a flowchart of an information sharing method according to embodiment seven of the present disclosure. This embodiment may be combined with the preceding embodiments, and after at least one target mail is shared with the sharee corresponding to the sharee information to display the target mail on the client interface corresponding to the sharee, the following step is added: displaying a preset sharing identifier at a preset position of the target mail; or adding the currently shared target mail to a preset sharing box. Explanations of terms identical to or corresponding to terms in the preceding embodiment are not repeated herein.

Referring to FIG. 14, the information sharing method provided in this embodiment includes steps described below.

In S660, in response to detecting a mail sharing operation triggered by a sharer for a first mail, at least one target mail currently to be shared is determined from a second mail matching the first mail, where the second mail includes the first mail and/or other mails.

In S670, sharee information is acquired and the at least one target mail is shared with a sharee corresponding to the sharee information according to the sharee information to display the target mail on a client interface corresponding to the sharee.

In S680, a preset sharing identifier is displayed at a preset position of the target mail; or the currently shared target mail is added to a preset sharing box.

The preset sharing identifier may refer to an identifier used for indicating that the target mail is a shared mail. If the target mail is shared with a mailbox client corresponding to the sharee, the preset sharing identifier may include a first preset sharing identifier and a second preset sharing identifier. In this manner, the first preset sharing identifier is used for indicating that the target mail is a mail shared by the sharer himself, and the second preset sharing identifier is used for indicating that the target mail is an obtained mail shared by others. The preset position of the target mail may be a preset position of a cell where the target mail in the mailing list is located, may be a preset position on a mail display interface of the target mail, or the like. The sharing box may be a pre-created storage container for storing the target mail shared by the sharer each time. As shown in FIG. 15, the sharing box may be similar to the inbox or the outbox in the mailbox. A display interface layout of shared mails in the sharing box may be the same as a display interface layout of mails in the inbox or the outbox.

The preset sharing identifier may be displayed at the preset position of the target mail so that the shared mails and other mails in the current mailbox may be distinguished. The mail shared each time may be stored separately by using the sharing box so that the sharer may quickly view all shared mails in the sharing box.

Exemplarily, in the case of using the sharing box to store the shared mail, if no shared mail exists in the current mailbox, the sharing box may be hidden. When the sharer shares a mail for the first time, the sharing box may be displayed at a preset display position, and the target mail shared for the first time is copied to the sharing box. When subsequent mails are shared, the subsequent target mail shared each time may be directly copied to the sharing box. For example, abbreviated information of each shared mail may be displayed in a list of shared mails in the sharing box, that is, abbreviated information of one shared mail is displayed in each cell in the list of shared mails, and when the mail viewing operation is triggered for a cell where the abbreviated information is located, detailed information of a corresponding shared mail may be displayed on a right side of the list of shared mails.

If the target mail is shared with the mailbox client corresponding to the sharee, a preset sharing identifier may be displayed at a preset position of the currently received shared mail in the mailbox client of the sharee based on the same mail distinguishing manner in the mailbox client of the sharer; or the currently received shared mail is added to the preset sharing box so that the shared mail is distinguished from other mails.

In the technical schemes in this embodiment, a preset sharing identifier is displayed at a preset position of the target mail, or one sharing box stores shared mails separately so that the shared mails and non-shared mails in the current mailbox can be effectively distinguished, which is convenient for the sharer to identify the mails, thereby improving the user experience.

Based on the preceding technical schemes, "the currently shared target mail is added to the preset sharing box" in S680 may include that: multiple target mails currently shared are combined into one shared mail group and the shared mail group is added to the preset sharing box. The shared mail group may refer to one mail group formed by multiple shared mails currently shared so that multiple shared mails shared each time are stored at the same position.

As shown in FIG. 15, multiple target mails currently shared may be combined into one shared mail group, abbreviated information of the shared mail group is displayed in a list of shared mail groups in the sharing box, and detailed information of the shared mail group is displayed on a right side of a mailing list in the sharing box so that the shared mail group is added to the sharing box and displayed. Since each shared mail group corresponds to one sharing operation, each target mail shared each time may be viewed intuitively, thereby improving the user experience. For example, the number of currently shared target mails may be displayed at a preset position of a cell where the shared mail group is located so as to intuitively remind the sharer of the number of target mails shared each time.

Exemplarily, if the target mail is shared with the mailbox client corresponding to the sharee, currently received target mails may also be combined into one shared mail group in the mailbox client of the sharee, and the shared mail group is added to the preset sharing box. Exemplarily, the mailbox client of the sharer may display the first preset sharing identifier at the preset position of the cell where the shared mail group is located; and the mailbox client of the sharee may display the second preset sharing identifier at the preset position of the cell where the shared mail group is located, thereby facilitating distinguishing whether each shared mail group in the sharing box is a mail group shared by the sharer himself or a mail group shared by others.

Embodiment Eight

Figure 16:
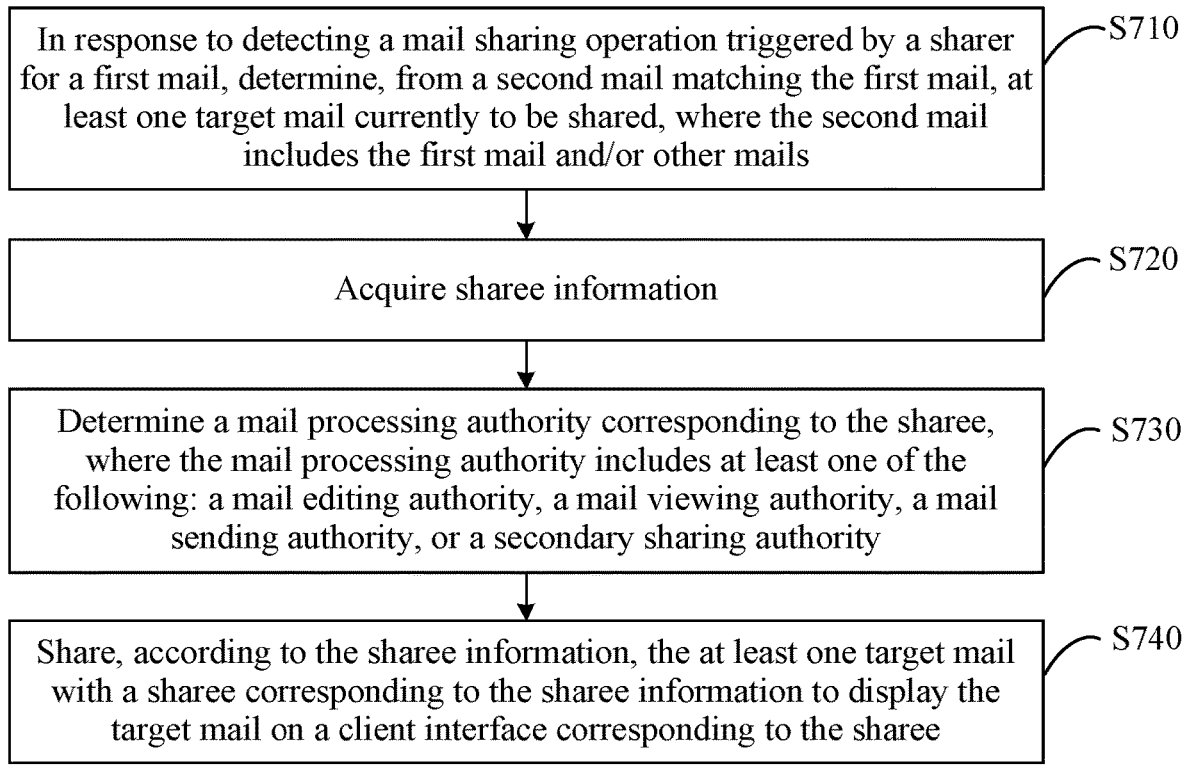
FIG. 16 is a flowchart of an information sharing method according to embodiment eight of the present disclosure.

FIG. 16 is a flowchart of an information sharing method according to embodiment eight of the present disclosure. This embodiment may be combined with the preceding embodiments, and a step of "determining a mail processing authority corresponding to the sharee" is added. Explanations of terms identical to or corresponding to terms in the preceding embodiment are not repeated herein.

Referring to FIG. 16, the information sharing method provided in this embodiment includes steps described below.

In S710, in response to detecting a mail sharing operation triggered by a sharer for a first mail, at least one target mail currently to be shared is determined from a second mail matching the first mail, where the second mail includes the first mail and/or other mails.

In S720, sharee information is acquired.

In S730, a mail processing authority corresponding to a sharee is determined, where the mail processing authority includes at least one of the following: a mail editing authority, a mail viewing authority, a mail sending authority, or a secondary sharing authority.

The mail editing authority may refer to an authority of editing and viewing a shared mail. The mail editing authority may be set to an authority through which all positions in the mail may be edited, or a corresponding mail editing sub-authority may be set based on each editable mail position so that the sharee may only edit a mail position corresponding to the mail editing sub-authority. The mail viewing authority may refer to an authority of only viewing a shared mail and not editing the shared mail. The secondary sharing authority may refer to an authority through which the sharee may share the mail.

Each optional mail processing authority corresponding to the sharee may be displayed on the display interface so that the sharer may select the corresponding mail processing authority for the sharee, and the mail processing authority corresponding to the sharee may be obtained based on the selection operation of the sharer. When multiple sharees exist, the mail processing authority may be selected uniformly for the multiple sharees, or a respective mail processing authority may be selected separately for each sharee so as to satisfy the individual needs of users.

In S740, according to the sharee information, the at least one target mail is shared with the sharee corresponding to the sharee information to display the target mail on a client interface corresponding to the sharee.

In a client corresponding to the sharee, the sharee may perform corresponding processing on the displayed target mail based on the mail processing authority, thereby achieving the control of an authority of the sharee.

In the technical schemes in this embodiment, the mail processing authority of the sharee is determined so that the sharer may control the mail processing authority of the sharee, thereby satisfying the individual needs of users.

Based on the preceding technical schemes, after S740, the method may further include that: in response to detecting an edit operation performed by a sharee with the mail editing authority on the target mail, updating, both the target mail in a client corresponding to the sharer and a target mail received in a client corresponding to another sharee are updated according to current edited content of the sharee with the mail editing authority, so that based on the updated target mail, the sharer and the another sharee view the current edited content of the sharee with the mail editing authority. Alternatively, in response to detecting that the sharer edits the target mail, the target mail received in the client corresponding to the sharee is updated according to current edited content of the sharer so that based on the updated target mail, the sharee views the current edited content of the sharer.

When it is detected that the sharer edits the target mail, the current edited content may be sent to the client corresponding to the sharee so that the client corresponding to the sharee may update, based on the current edited content, the received target mail. It is also feasible that the currently edited target mail is re-shared with the client corresponding to the sharee so that the client corresponding to the sharee may update, based on the obtained re-shared target mail, the obtained target mail shared last time, the current edited content of the sharer may be synchronized to the target mail received by each sharee, and each sharee may view the current edited content of the sharer.

In the client corresponding to the sharee with the mail editing authority, in response to detecting that the target mail is edited by the sharee with the mail editing authority, current edited content of the sharee with the mail editing authority may be sent to the mailbox client corresponding to the sharer and clients corresponding to other sharees except for the sharee that has the mail editing authority and edits the mail currently so that the clients corresponding to other sharees and the mailbox client corresponding to the sharer both update the target mail based on the current edited content. It is also feasible that the currently edited target mail may be sent to the clients corresponding to other sharees and the mailbox client corresponding to the sharer so that the clients corresponding to other sharees and the mailbox client corresponding to the sharer both update existing target mails based on the currently received target mail. In this manner, the current edited content of the sharee with the mail editing authority may be synchronized to target mails received by other sharees and the target mail sent by the sharer so that the other sharees and the sharer may both view the current edited content of a target sharer, thereby achieving collaborative editing of the target mail.

Based on the preceding technical schemes, the method may further include that: in response to detecting a mail sending operation triggered by the sharer or a sharee with the mail sending authority for the updated target mail, the updated target mails are sent to a mailbox client corresponding to the recipient mailbox information based on recipient mailbox information in the updated target mail.

After the sharer and/or the sharee with the mail editing authority finishes editing the mail, the sharer or the sharee with the mail sending authority may trigger a mail sending button in the edited target mail so as to trigger the mail sending operation. When the mailbox client of the sharer detects the mail sending operation, the mailbox client of the sharer may send, based on the recipient mailbox information in the edited and updated target mail, the updated target mail as a normal mail to a mailbox client corresponding to the recipient mailbox information, so that the mailbox of the recipient may receive the updated target mail. The sharee may view and edit the target mail shared by the sharer, but only the sharer and the sharee with the mail sending authority have the authority of sending the mail so as to prevent the sharee from sending the shared mail arbitrarily, thereby ensuring the safety of the shared mail.

In a process of implementing the present disclosure, the applicant of the present disclosure found that when the user shares a mail with other users so that other users may learn mail content, in some embodiments, only the mail content is displayed in the mails obtained by other users, and the displayed information is not comprehensive enough, thereby reducing the user experience. In view of this, in some embodiments of the present disclosure, in response to receiving a target mail shared by a sharer based on a mail sharing operation, sharer information is acquired, and the target mail and the sharer information are displayed on a client interface of a sharee so that display information of the shared mail is enriched, and the sharee may quickly learn the sharer information of the shared mail, thereby improving the user experience.

Embodiment Nine

Figure 17:
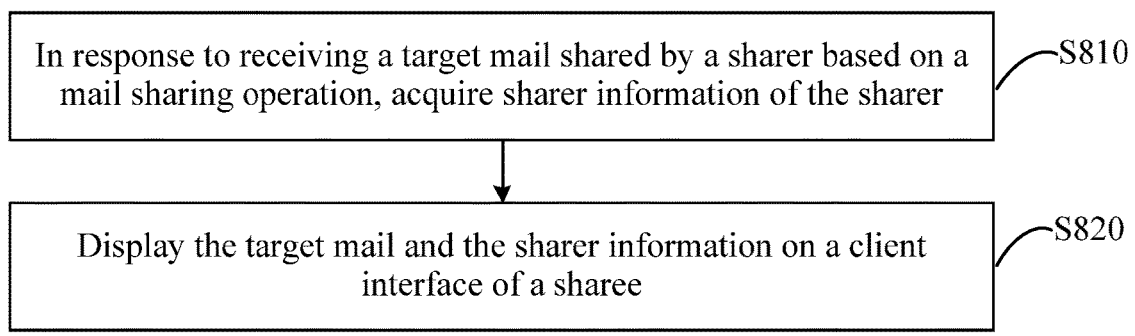
FIG. 17 is a flowchart of an information display method according to embodiment nine of the present disclosure.

FIG. 17 is a flowchart of an information display method according to embodiment nine of the present disclosure. This embodiment is applicable to a case where information shared by a sharer is displayed on a client interface of a sharee. The method may be performed by an information display apparatus, and the apparatus may be implemented by software and/or hardware and integrated into a mailbox client or an IM client of a sharee. The mailbox client and the IM client may be integrated into a PC or a mobile terminal. As shown in FIG. 17, the method includes steps described below.

In S810, in response to receiving a target mail shared by a sharer based on a mail sharing operation, sharer information is acquired.

The mail sharing operation may refer to an operation that is triggered by the sharer and used for sharing a mail in a mailbox of the sharer with the sharee. The target mail may refer to a mail currently shared by the sharer. One or more target mails may be provided. The sharer information may be information used for uniquely characterizing an identity of the sharer, and the sharer information may include, but is not limited to, at least one of a name of the sharer, a mail account name, or an avatar identifier. The name of the sharer may include, but is not limited to a full name in Chinese characters, a full name in English, an abbreviation of the name in Chinese characters, or an abbreviation of the name in English. The mail account name may be a full mail account name or a mail prefix name. The avatar identifier may include, but is not limited to, a photo of the sharer.

A mailbox client of the sharer may share the target mail currently to be shared with the sharee based on the mail sharing operation and according to sharee IM information and/or sharee mailbox information so that the IM client and/or the mailbox client of the sharee may receive the shared target mail. If the sharer shares the target mail with only the IM client of the sharee, the technical schemes in this embodiment may be applied to the IM client of the sharee. If the sharer shares the target mail with only the mailbox client of the sharee, the technical schemes in this embodiment may be applied to the mailbox client of the sharee. If the sharer shares the target mail with both the IM client and the mailbox client of the sharee, the technical schemes in the embodiment may be applied to the IM client of the sharee and may also be applied to the mailbox client of the sharee.

In an embodiment, the sharer may share the target mail based on the mail sharing operation in the following manner in response to detecting the mail sharing operation triggered by the sharer for the first mail, the mailbox client of the sharer determines at least one target mail currently to be shared from a second mail matching the first mail, where the second mail includes the first mail and/or other mails; and the mailbox client of the sharer acquires sharee information and shares the at least one target mail with a sharee corresponding to the sharee information according to the sharee information to display the target mail on a client interface corresponding to the sharee. For the manner in which the sharer shares the target mail, reference may be made to embodiments one to eight.

When sharing the target mail, the mailbox client of the sharer may share both the target mail and the sharer information with the sharee so that when the IM client or the mailbox client of the sharee receives the target mail, the IM client or the mailbox client of the sharee may obtain the sharer information actively sent by the mailbox client of the sharer. Alternatively, after receiving the target mail, the IM client or the mailbox client of the sharee may send a sharer information acquisition request to a mailbox server and acquire response information returned by the mailbox server based on the sharer information acquisition request, that is, the sharer information is acquired.

In S820, the target mail and the sharer information are displayed on a client interface of a sharee.

The target mail and the sharer information may be displayed in the same interface or in different interfaces in the same client. For example, if the sharer shares the target mail with only the IM client of the sharee, the target mail and the sharer information may be displayed on the same interface or different interfaces in the IM client of the sharee. If the sharer shares the target mail with only the mailbox client of the sharee, the target mail and the sharer information may be displayed on the same interface or different interfaces in the mailbox client of the sharee. If the sharer shares the target mail with the IM client and the mailbox client of the sharee, the target mail and the sharer information may be displayed on both the IM client and the mailbox client of the sharee. It is also feasible that prompt information including the sharer information is displayed only in the IM client and the target mail is displayed in the mailbox client.

After acquiring the target mail and the sharer information, the IM client or the mailbox client of the sharee may display mail information of the target mail and the sharer information on the client interface based on a preset display manner. For example, the mail information of the target mail and the sharer information may be displayed separately; or the sharer information may be displayed in association with the target mail so that the sharee may acquire the mail information of the target mail and the sharer information, the display information of the shared mail is enriched, and the sharee may quickly learn the sharer information of the shared mail, thereby improving the user experience.

In the technical schemes of the embodiments of the present disclosure, in response to receiving the target mail shared by the sharer based on the mail sharing operation, the sharer information of the sharer may be acquired, and the target mail and the sharer information are displayed on the client interface of the sharee so that the display information of the shared mail is enriched, and the sharee may quickly learn the sharer information of the shared mail, thereby improving the user experience.

Based on the preceding technical schemes, for a case where the sharer shares the target mail with the mailbox client of the sharee, S820 may include that: in the mailbox client of the sharee, the sharer information is displayed in association with the displayed target mail.

After acquiring the sharer information, the mailbox client of the sharer may display the sharer information in association with the target mail. For example, the sharer information may be displayed at a preset position on a mail display interface of the target mail so as to indicate who initiates the sharing of the target mail. For example, the avatar identifier of the sharer may be displayed on the mail display interface; or based on a preset text format, sharer prompt text information may be generated according to the sharer information and displayed on the mail display interface. For example, FIG. 18 is a display example of sharer information. As shown in FIG. 18, the sharer information includes a name of the sharer and a mail account of the sharer, the corresponding sharer prompt text information may be that: the sharing of the mail is initiated by Li Si lisi@xxx.com, and the sharer prompt text information may be displayed below subject information (that is, 123aaabbb) of the target mail, so as to more intuitively remind the sharee of who shares the mail Exemplarily, the mail information of the target mail and the sharer prompt text information may be displayed by using different display colors or different fonts so that the sharee may more intuitively and clearly learn who shares the mail, thereby improving the user viewing experience.

Based on the preceding technical schemes, the step in which the sharer information is displayed on the client interface of the sharee in S820 may include that: a sharing mail prompt message is generated according to the sharer information and message notification is performed based on the sharing mail prompt message.

The sharing mail prompt message may refer to a message used for prompting the sharee that the mail shared by the sharer is currently received. For example, the sharing mail prompt message may be: receiving a shared mail initiated by Zhang San.

The IM client or the mailbox client of the sharee may generate the sharing mail prompt message including the sharer information based on a preset message generation format and may add the sharing mail prompt message to a feed information stream in the IM client or the mailbox client of the sharee so that the sharing mail prompt message is quickly notified to the sharee in a manner of the feed information stream, and based on the sharing mail prompt message, the sharee may quickly learn who initiates the sharing of the mail, thereby improving the user experience.

Exemplarily, if the mailbox client of the sharer shares the target mail with both the IM client and the mailbox client of the sharee, the IM client of the sharee may generate the sharing mail prompt message according to the sharer information and perform message notification based on the sharing mail prompt message; and the mailbox client of the sharee may display the received target mail on the interface. In view of this case, the method may further include: in the case where the IM client of the sharee detects a mail viewing operation triggered by the sharee based on the sharing mail prompt message, jumping to a mailbox client interface of the sharee to display the target mail.

The sharee may click on the sharing mail prompt message in the IM client to trigger the mail viewing operation. In response to detecting the mail viewing operation, the IM client of the sharee may automatically jump to the mailbox client of the sharee to display the target mail so that the sharee may quickly view the target mail in the mailbox client, thereby improving a viewing efficiency. Exemplarily, the mailbox client of the sharee may also display the sharer information in association with the target mail In this manner, the mailbox client of the sharee redisplays the sharer information on the mail display interface of the target mail so that the sharee may be prompted again and the sharee is prevented from forgetting the target mail, thereby improving the user experience.

Based on the preceding technical schemes, the method further includes that: sharer prompt information is displayed on a mail display interface of the target mail after a mailbox client of the sharer shares the target mail.

The sharer prompt information may refer to information for prompting the sharer that the mail is automatically initiated to be shared. For example, the sharer prompt information may be: the sharing of this mail is initiated by you.

Based on the preceding technical schemes, the method further includes that: a second sharing identifier is displayed on a client interface of the sharee, where the second sharing identifier is used for characterizing that the target mail is shared from another client, and the second sharing identifier has a different display style from a first sharing identifier displayed by a client of the sharer.

Since the same user may switch from a sharer to a sharee and may also switch from a sharee to a sharer, the mailbox of the same user may include both mails actively shared by the user and received mails shared by other users. In view of this, after sharing the target mail, the mailbox client of the sharer may display the sharer prompt information at any blank position on the mail display interface of the target mail, for example, below a position where subject information is located, so as to indicate that the mail is actively shared by the user. In this manner, the user may intuitively distinguish mails actively shared by the user from received mails shared by others, thereby improving the user experience.

Embodiment Ten

Figure 19:
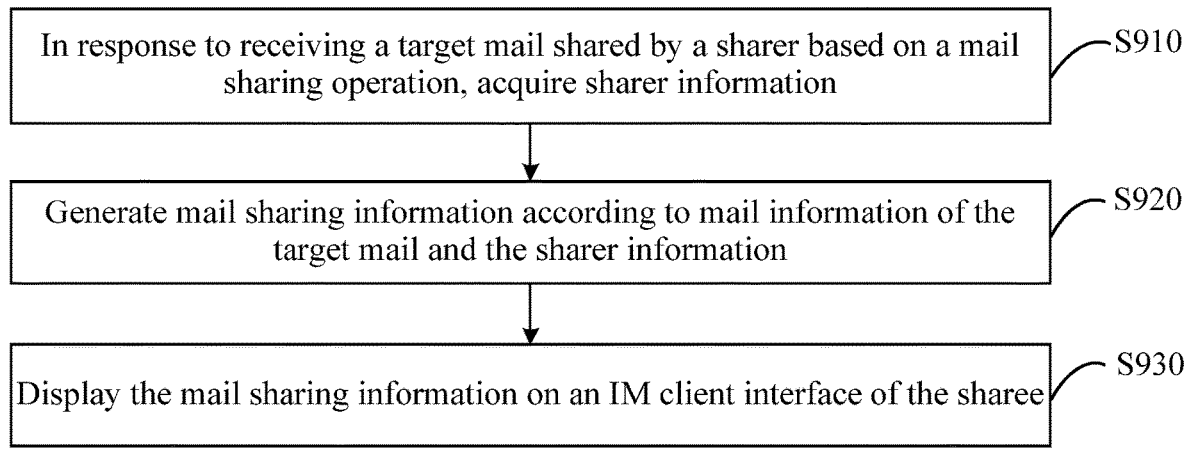
FIG. 19 is a flowchart of an information display method according to embodiment ten of the present disclosure.

FIG. 19 is a flowchart of an information display method according to embodiment ten of the present disclosure. This embodiment may be combined with the preceding embodiments, and for a case where a sharer shares a target mail with an IM client of a sharee, an information display method is described. Explanations of terms identical to or corresponding to terms in the preceding embodiment are not repeated herein.

Referring to FIG. 19, the information display method provided in this embodiment includes steps described below.

In S910, in response to receiving a target mail shared by a sharer based on a mail sharing operation, sharer information is acquired.

In S920, mail sharing information is generated according to mail information of the target mail and the sharer information of the share.

The mail sharing information may be a session message used for displaying information. The mail sharing information may be used for prompting the user that a shared target mail currently exists.

The IM client of the sharee may integrate the mail information of the target mail with the sharer information based on a preset display manner and generate the mail sharing information so that the mail sharing information may display the mail information of the target mail and the sharer information in the preset display manner (for example, in a form of a card). Alternatively, if the mailbox client of the sharer generates the mail sharing information in advance according to the mail information of the target mail and performs mail sharing by sharing the mail sharing information, the IM client of the sharee may receive the mail sharing information, acquire the sharer information, and add the sharer information to the mail sharing information based on a preset adding manner so that the mail sharing information including the mail information of the target mail and the sharer information of the sharer is obtained. Alternatively, if the mailbox client of the sharer generates the mail sharing information in advance according to the mail information of the target mail and the sharer information and performs mail sharing by sharing the mail sharing information, the IM client of the sharee may directly acquire the mail sharing information that includes the mail information of the target mail and the sharer information and is sent by the mailbox client of the sharer.

In S930, the mail sharing information is displayed on an IM client interface of the sharee.

The IM client of the sharee may display the mail sharing information (for example, a mail card) in a target IM dialog window corresponding to the sharee information. If the sharee information is information of an IM user, an IM user individual dialog window corresponding to the information of the IM user may be determined as a target dialog window. If the sharee information includes information of an IM user group, an IM user group dialog window corresponding to the information of the IM user group may be determined as a target dialog window. The mail sharing information is displayed so that the sharee may obtain the mail information of the target mail and the sharer information, the display information is enriched, and the sharee may quickly learn the sharer information of the shared mail, thereby improving the user experience.

Exemplarily, after S930, the method may further include that: in response to detecting a mail viewing operation triggered for the mail sharing information, mail content of the target mail is displayed.

Figure 20:
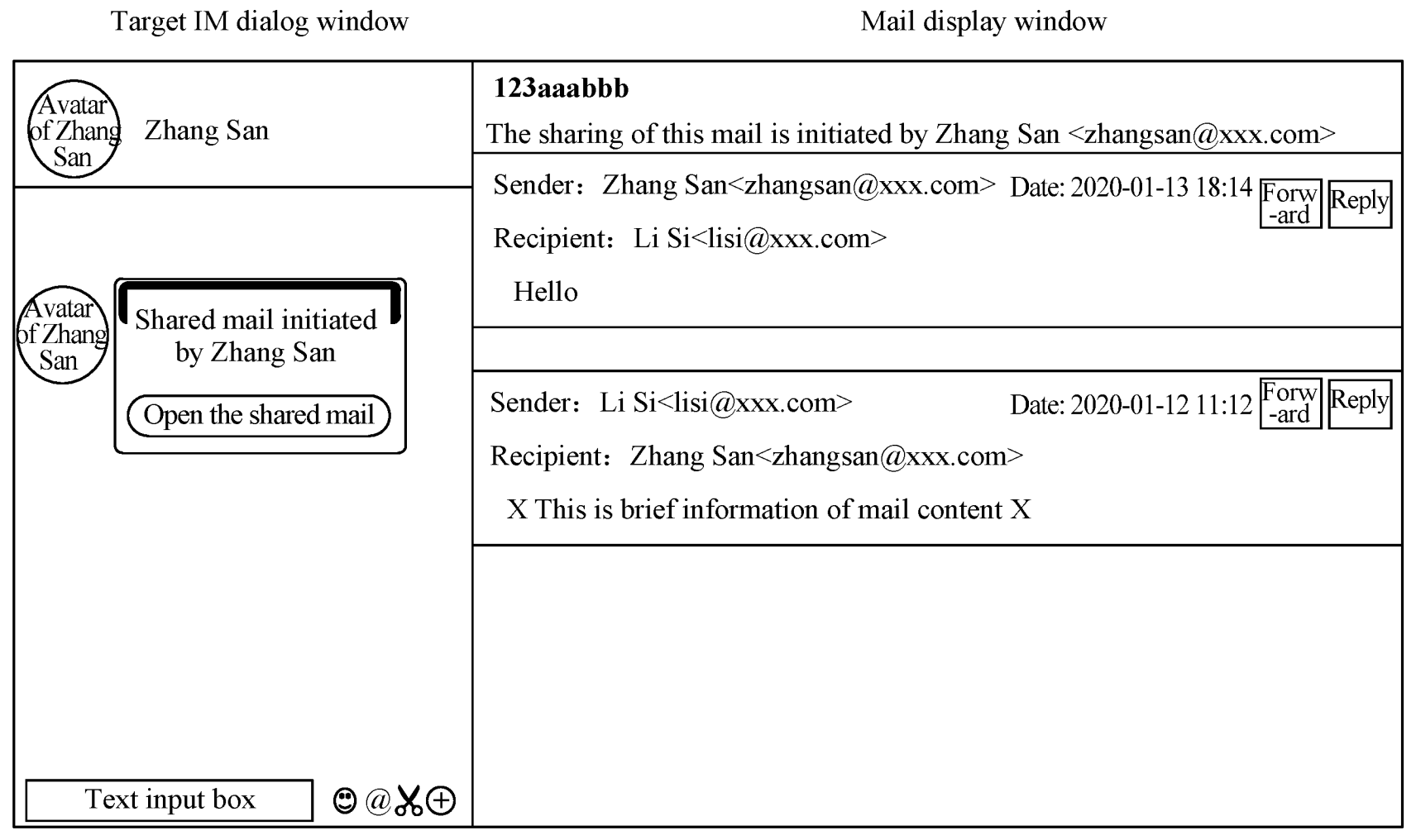

The mail sharing information may also be interactive session information and may exist in various interactive forms. For example, the mail sharing information may be a display entry used for displaying the mail information of the target mail. In this manner, the mail sharing information is triggered so that the mail content of the target mail may be displayed. Exemplarily, FIG. 20 is a display example of an IM client interface. As shown in FIG. 20, after Zhang San shares the target mail with the sharee, in the IM client of the sharee, an individual dialog window formed by the sharee and Zhang San may be determined as a target IM dialog window and the mail sharing information is displayed in the target IM dialog window. The sharee may trigger the mail viewing operation by clicking on the mail sharing information, where the clicking operation may be, but is not limited to, a touch click manner or a mouse click manner. For example, if the mail sharing information is presented in a form of a mail card, the sharee may trigger the mail viewing operation by clicking on an "Open the Shared mail" button on the mail card in FIG. 20. In response to detecting the mail viewing operation, the IM client of the sharee displays the mail content of the target mail in a preset display manner. For example, in response to detecting the mail viewing operation, an independent mail display window may be created, abbreviated information of each target mail currently shared is displayed in a list in the mail display window, and when a details viewing operation triggered for a cell where the abbreviated information is located is detected, the cell may be extended so as to display detailed information of the corresponding target mail.

Exemplarily, card display content of the mail sharing information may include the sharer information of the sharer; and/or the mail content of the target mail may include the sharer information of the sharer.

As shown in FIG. 20, the sharer information may be added to the display content of the mail sharing information to be displayed directly in the mail sharing information. For example, the mail sharing information includes "the shared mail initiated by Zhang San" so that the user may quickly learn the sharer of the mail. Alternatively, the sharer information may be displayed in association with the mail content of the target mail. In this manner, the sharer information may be displayed at any blank position on a display interface of the mail display window so that the sharee may view the sharer information while viewing the mail information of the target mail, thereby improving the user viewing experience.

Figure 21:
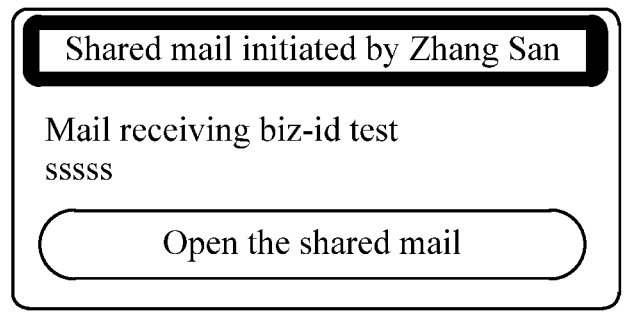
FIG. 21 is a display example of mail sharing information according to embodiment ten of the present disclosure.

Exemplarily, the card display content of the mail sharing information may further include at least one of subject information of the target mail or text summary information of the target mail. The text summary information may refer to content of a first preset number of characters in a mail body. For example, the first line of content in the mail body is used as the text summary information. For example, FIG. 21 is a display example of mail sharing information in a form of a mail card. As shown in FIG. 21, the sharer information (Zhang San), subject information (a mail receiving biz-id test), and information (sssss) in the text summary information may be displayed on the mail card so that the sharee may be briefly reminded of the mail content of the received shared mail, and the user may have a preliminary understanding of the mail content in advance, thereby improving the user experience.

Exemplarily, the step in which the mail content of the target mail is displayed may include that: when the mail content of the target mail includes the sharer information, the sharer information is displayed at a preset relative position of a position where subject information of the target mail is located.

The preset relative position of the position where the subject information of the target mail is located may refer to a blank region above, below, or on a right side of the position where the subject information is located.

As shown in FIG. 20, the sharer information may be displayed below the position where the subject information of the target mail is located so that the sharee may be more intuitively reminded of who shares the mail. Exemplarily, the mail information of the target mail and the sharer prompt information may be displayed by using different display colors or different fonts so that the sharee may more intuitively and clearly learn who shares the mail, thereby improving the user viewing experience.

In the technical schemes of the embodiments of the present disclosure, the mail sharing information including the mail information and the sharer information is displayed on the IM client interface of the sharee so that the sharee may quickly learn the mail information and the sharer information based on the mail sharing information, thereby enriching the display information of the shared mail and improving the user experience.

The following is an example of an information sharing apparatus provided in the embodiments of the present disclosure. The apparatus and the information sharing method in the preceding embodiments belong to the same concept. For details not described in embodiments of the information sharing apparatus, reference may be made to embodiments of the information sharing method.

Embodiment Eleven

Figure 22:
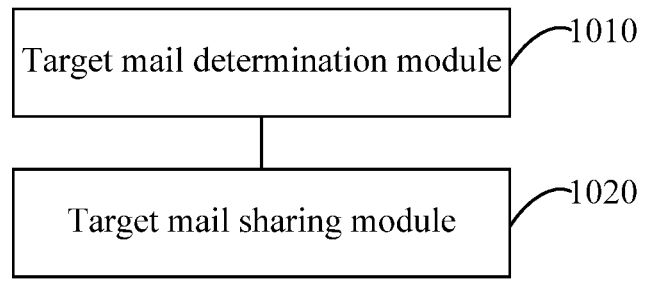
FIG. 22 is a structural diagram of an information sharing apparatus according to embodiment eleven of the present disclosure.

FIG. 22 is a structural diagram of an information sharing apparatus according to embodiment eleven of the present disclosure. This embodiment is applicable to a case where a mail of one user is shared with other users. The apparatus includes a target mail determination module 1010 and a target mail sharing module 1020.

The target mail determination module 1010 is configured to, in response to detecting a mail sharing operation triggered by a sharer for a first mail, determine at least one target mail currently to be shared. The target mail sharing module 1020 is configured to acquire sharee information and share, according to the sharee information, the at least one target mail with a sharee corresponding to the sharee information to display the target mail on a client interface corresponding to the sharee.

Based on the preceding technical schemes, the target mail determination module determines the target mail currently to be shared in the following manner the target mail determination module determines the target mail currently to be shared from a second mail matching the first mail, where the second mail includes at least one of the first mail or another mail.

In the technical schemes of the embodiments of the present disclosure, in response to detecting a mail sharing operation triggered by a sharer for a first mail, at least one target mail currently to be shared is determined from a second mail matching the first mail, and the at least one target mail is shared, according to acquired sharee information, with a sharee corresponding to the sharee information. In this manner, at least one target mail matching each other may be shared with the sharee at one time without the need for the user to search for associated mails by himself, and there is no need to perform sharing for multiple times, which simplifies the user sharing operation, improves the sharing efficiency, and improves the user experience.

Based on the preceding technical schemes, the first mail includes a mail being edited, a received mail in an inbox, a sent mail in an outbox, or an edited mail stored in a draft box.

Based on the preceding technical schemes, the target mail determination module 1010 is configured to, in the case where the first email is a mail being edited, determine the first mail as the target email currently to be shared; the apparatus further includes a target mail update module, where the target mail update module is configured to share the target mail with the sharee corresponding to the sharee information so that after the target mail is displayed on the client interface corresponding to the sharee, in response to detecting an edit operation performed by the sharer on the target mail, the target mail received in the client corresponding to the sharee is updated according to current edited content of the sharer, and the sharee views the current edited content of the sharer based on the updated target mail.

Based on the preceding technical schemes, the target mail determination module 1010 includes a first similarity determination unit, a second mail determination unit, and a target mail determination unit. The first similarity determination unit is configured to determine a first similarity between the first mail and an existing mail according to mail information of the first mail and mail information of the existing mail in a list of existing mails. The second mail determination unit is configured to determine, according to the first similarity, the second mail matching the first mail from the list of existing mails. The target mail determination unit is configured to determine, from the second mail, at least one target mail currently to be shared.

Based on the preceding technical schemes, the list of existing mails includes at least one of a list of received mails in an inbox, a list of sent mails in an outbox, or a list of edited mails in a draft box.

Based on the preceding technical schemes, the first similarity determination unit is configured to, in the case where the first mail and the existing mail in the list of existing mails have the same subject information and the same sender and receiver information, determine the first similarity between the first mail and the existing mail as a preset value; and/or in the case where the first mail and the existing mail in the list of existing mails have the same subject information and a reference relationship exists between the existing mail and the first mail, determine the first similarity between the first mail and the existing mail as the preset value. The target mail determination unit is configured to determine at least one existing mail in the list of existing mails whose first similarity with the first mail is the preset value as the second mail matching the first mail.

Based on the preceding technical schemes, the apparatus further includes a sharing success prompt identifier display module. The sharing success prompt identifier display module is configured to display a sharing success prompt identifier at a preset position of a first cell in a mailing list including the target mail after the at least one target mail is shared with the sharee corresponding to the sharee information to display the target mail on the client interface corresponding to the sharee, where the first cell is configured to display abbreviated information of the target mail.

Based on the preceding technical schemes, the apparatus further includes a sharing success prompt identifier deletion module. The sharing success prompt identifier deletion module is configured to, in response to detecting a mail viewing operation triggered by the sharer for the target mail, delete the displayed sharing success prompt identifier.

Based on the preceding technical schemes, the target mail determination module 1010 is configured to determine a target mail group where the first mail is located from a current mailbox, where mails matching each other in the current mailbox are stored in a form of a mail group; and determine, from the target mail group, the at least one target mail currently to be shared.

Based on the preceding technical schemes, the apparatus further includes a new mail sharing module and a shared mail deletion module. The new mail sharing module is configured to, in response to a storage operation of a new mail in the target mail group, share the new mail stored in the target mail group with the sharee corresponding to the sharee information after the at least one target mail is shared with the sharee corresponding to the sharee information to display the target mail on the client interface corresponding to the sharee. The shared mail deletion module is configured to, in response to a deletion operation of a shared mail in the target mail group, delete the shared mail in the target mail shared with the sharee.

Based on the preceding technical schemes, the target mail sharing module 1020 is configured to acquire sharee IM information in an IM client of the sharer; and share, according to the sharee IM information, the at least one target mail with the sharee corresponding to the sharee IM information to display the target mail on an IM client interface of the sharee.

Based on the preceding technical schemes, the apparatus further includes a mail card determination module. The mail card determination module is configured to generate a mail card according to mail information of the target mail after the at least one target mail currently to be shared is determined from the second mail. The target mail sharing module 1020 is configured to send the mail card to an IM client of the sharee corresponding to the sharee IM information to display the mail card on the IM client interface of the sharee, and in response to detecting a mail viewing operation triggered for the mail card, display mail content of the target mail.

Based on the preceding technical schemes, the card display content of the mail card includes at least one of subject information of the target mail, text summary information of the target mail, or sharer information of the sharer.

Based on the preceding technical schemes, the IM client includes a mail content display module. The mail content display module is configured to create a mail display window that is displayed on a same screen as an IM dialog window and display the mail content of the target mail in the mail display window.

Based on the preceding technical schemes, the mail content display module is further configured to display abbreviated information of the target mail in a form of a list; and in response to detecting a details viewing operation triggered for the abbreviated information, display details of the target mail.

Based on the preceding technical schemes, the IM client of the sharer further includes a mail card forwarding module.

The mail card forwarding module is configured to, in the case where the IM client of the sharer detects a message forwarding operation triggered by the sharer for the mail card, send the mail card to an IM user and/or an IM user group selected by the sharer.

Based on the preceding technical schemes, the apparatus further includes a state information display module. The state information display module is configured to, after the at least one target mail is shared with the sharee corresponding to the sharee IM information to display the target mail on the IM client interface of the sharee, acquire state information of a target message in an IM session, where the target message includes a message sent by the sharer for the target mail or a message sent by the sharee for the target mail; and based on the state information of the target message, display the state information on a mailbox client interface of the sharer and/or a mailbox client interface of the sharee.

Based on the preceding technical schemes, the state information display module is configured to acquire information of an unread message based on whether the target message in the IM session is read by an information receiver; and display the information of the unread message on the mailbox client interface of the sharer and/or the mailbox client interface of the sharee.

Based on the preceding technical schemes, the apparatus further includes a sharee mailbox information acquisition module. The sharee mailbox information acquisition module is configured to acquire sharee mailbox information. The target mail sharing module 1020 is further configured to share the at least one target mail with a mailbox client of the sharee according to the sharee mailbox information to display the target mail on the mailbox client interface of the sharee.

Based on the preceding technical schemes, the target mail sharing module 1020 is configured to send a sharing mail prompt message to an IM client of the sharee according to the sharee IM information so that the sharee views the target mail in the mailbox client of the sharee based on the sharing mail prompt message.

Based on the preceding technical schemes, the target mail sharing module 1020 is configured to acquire sharee mailbox information in a mailbox client of the sharer; and share, according to the sharee mailbox information, the at least one target mail with the sharee corresponding to the sharee mailbox information to display the target mail on a mailbox client interface of the sharee.

Based on the preceding technical schemes, the apparatus further includes a preset sharing identifier display module. The preset sharing identifier display module is configured to after the at least one target mail is shared with the sharee corresponding to the sharee mailbox information to display the target mail on the mailbox client interface of the sharee, the mailbox client of the sharer displays a first preset sharing identifier at a preset position of a first cell in a mailing list including the target mail, where the first cell is configured to display abbreviated information of the target mail; and a mailbox client of the sharee displays a second preset sharing identifier at a preset position of a second cell in the mailing list including the received target mail, where the second cell is configured to display the abbreviated information of the received target mail.

Based on the preceding technical schemes, the target mail determination module 1010 further includes a target mail determination unit. The target mail determination unit is configured to display the second mail matching the first mail on a display interface; and determine the at least one target mail currently to be shared according to the second mail selected by the sharer on the display interface.

Based on the preceding technical schemes, the apparatus further includes an identity acquisition module and an identity display module. The identity acquisition module is configured to after the at least one target mail is shared with the sharee corresponding to the sharee information to display the target mail on the client interface corresponding to the sharee, acquire an identity of the sharee; and the identity display module is configured to display the identity of the sharee on a mail display interface of the target mail in a mailbox client of the sharer.

Based on the preceding technical schemes, the identity display module is configured to, in the case where a number of sharees is less than or equal to a first preset number, display an identity of each sharee on the mail display interface of the target mail in the mailbox client of the sharer; and in the case where the number of the sharees is greater than the first preset number, display identities of the sharees on the mail display interface of the target mail in the mailbox client of the sharer based on a preset abbreviated display manner.

Based on the preceding technical schemes, the identity display module is further configured to detect whether a mail viewing operation triggered by the sharee for the target mail exists; in the case where the mail viewing operation triggered by the sharee for the target mail does not exist, display the identity of the sharee on the mail display interface of the target mail in the mailbox client of the sharer in a first identifier display manner; and in the case where the mail viewing operation triggered by the sharee for the target mail exists, display the identity of the sharee from the first identifier display manner to a second identifier display manner.

Based on the preceding technical schemes, the apparatus further includes a sharee adding module. The sharee adding module is configured to, after the at least one target mail is shared with the sharee corresponding to the sharee information to display the target mail on the client interface corresponding to the sharee, in response to detecting a sharee adding operation triggered by the sharer on a mail display interface of the target mail, acquire information of a sharee to be added and share the at least one target mail with the sharee corresponding to the information of the sharee to be added according to the information of the sharee to be added.

Based on the preceding technical schemes, mail content of the target mail displayed on the client interface corresponding to the sharee includes an attachment download link. The apparatus further includes an identity authentication module. The identity authentication module is configured to, in response to receiving an attachment download request sent by a client corresponding to the sharee for the attachment download link, perform identity authentication according to requester information in the attachment download request; and in response to detecting that the requester information satisfies a preset download condition, allow an attachment download operation.

Based on the preceding technical schemes, the mail content of the target mail displayed on the client interface corresponding to the sharee includes sharer prompt information, where the sharer prompt information is determined based on identity information of the sharer.

Based on the preceding technical schemes, the apparatus further includes a target mail deletion module. The target mail deletion module is configured to, after the at least one target mail is shared with the sharee corresponding to the sharee information to display the target mail on the client interface corresponding to the sharee, in response to detecting a sharing stop operation triggered by the sharer, send a mail deletion instruction to a client corresponding to the sharee so that the client corresponding to the sharee deletes the received target mail based on the mail deletion instruction.

Based on the preceding technical schemes, the apparatus further includes an identifier display module or a target mail adding module. The identifier display module is configured to, after the at least one target mail is shared with the sharee corresponding to the sharee information to display the target mail on the client interface corresponding to the sharee, display a preset sharing identifier at a preset position of the target mail. The target mail adding module is configured to, after the at least one target mail is shared with the sharee corresponding to the sharee information to display the target mail on the client interface corresponding to the sharee, add the currently shared target mail to a preset sharing box.

Based on the preceding technical schemes, the target mail adding module is configured to combine the currently shared target mails into one shared mail group and add the one shared mail group to the preset sharing box.

Based on the preceding technical schemes, the apparatus further includes a mail processing authority determination module. The mail processing authority determination module is configured to, before the at least one target mail is shared with the sharee corresponding to the sharee information to display the target mail on the client interface corresponding to the sharee, determine a mail processing authority corresponding to the sharee, where the mail processing authority includes at least one of the following: a mail editing authority, a mail viewing authority, a mail sending authority, or a secondary sharing authority.

Based on the preceding technical schemes, the apparatus further includes an edited content synchronization module. The edited content synchronization module is configured to, in response to detecting an edit operation performed by a sharee with the mail editing authority on the target mail, update, according to current edited content of the sharee with the mail editing authority, both the target mail in a client corresponding to the sharer and a target mail received in a client corresponding to another sharee so that the sharer and the another sharee view, based on the updated target mail, the current edited content of the sharee with the mail editing authority.

Based on the preceding technical schemes, the apparatus further includes a target mail sending module. The target mail sending module is configured to, in response to detecting a mail sending operation triggered by the sharer or a sharee with the mail sending authority for the updated target mail, send, based on recipient mailbox information in the updated target mail, the updated target mail to a mailbox client corresponding to the recipient mailbox information.

Based on the preceding technical schemes, the target mail determination module is configured to, in response to detecting a mail sharing operation triggered by the sharer for a target mail group, determine a mail in the target mail group as the target mail currently to be shared.

Based on the preceding technical schemes, the target mail determination module is further configured to, in response to detecting that a newly-added mail exists in the target mail group, share the newly-added mail with the sharee corresponding to the sharee information.

The newly-added mail may be a mail newly added in the target mail group compared to a mail group shared last time through the mail group sharing operation.

Based on the preceding technical schemes, the target mail sharing module is further configured to display a first sharing identifier, where the first sharing identifier indicates that the target mail group is shared.

The information sharing apparatus provided in the embodiments of the present disclosure may perform the information sharing method provided in any embodiment of the present disclosure and has corresponding functional modules for performing the information sharing method.

Each unit and module included in the embodiments of the information sharing apparatus are just divided according to functional logic, and the division is not limited to this, as long as the corresponding functions can be achieved. In addition, the name of each functional unit is just intended for distinguishing and is not to limit the scope of the present disclosure.

The following is an example of an information display apparatus provided in the embodiments of the present disclosure. The apparatus and the information display method in the preceding embodiments belong to the same concept. For details not described in embodiments of the information display apparatus, reference may be made to embodiments of the information display method.

Embodiment Twelve

Figure 23:
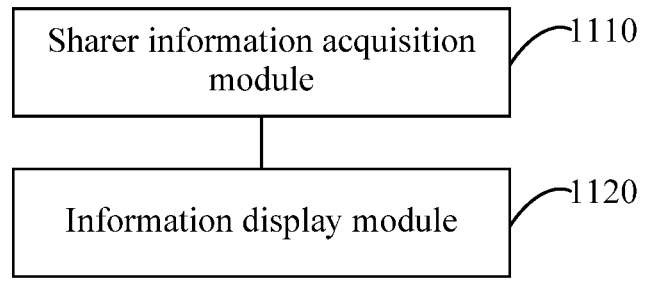
FIG. 23 is a structural diagram of an information display apparatus according to embodiment twelve of the present disclosure.

FIG. 23 is a structural diagram of an information display apparatus according to embodiment twelve of the present disclosure. This embodiment is applicable to the case where information shared by a sharer is displayed on a client interface of a sharee. The apparatus includes a sharer information acquisition module 1110 and an information display module 1120.

The sharer information acquisition module 1110 is configured to acquire sharer information in response to receiving a target mail shared by the sharer based on a mail sharing operation. The information display module 1120 is configured to display the target mail and the sharer information on a client interface of a sharee.

In the technical schemes of the embodiments of the present disclosure, in response to receiving the target mail shared by the sharer based on the mail sharing operation, the sharer information is acquired, and the target mail and the sharer information are displayed on the client interface of the sharee so that the display information of the shared mail is enriched, and the sharee may quickly learn the sharer information of the shared mail, thereby improving the user experience.

Based on the preceding technical schemes, the information display module 1120 is configured to generate mail sharing information according to mail information of the target mail and the sharer information, and display the mail sharing information on an IM client interface of the sharee.

Based on the preceding technical schemes, the information display module 1120 is further configured to, after the mail sharing information is displayed on the IM client interface of the sharee, in response to detecting a mail viewing operation triggered for the mail sharing information, display mail content of the target mail.

Based on the preceding technical schemes, card display content of the mail sharing information includes the sharer information of the sharer; and/or the mail content of the target mail includes the sharer information of the sharer.

Based on the preceding technical schemes, the card display content of the mail sharing information further includes at least one of subject information of the target mail or text summary information of the target mail.

Based on the preceding technical schemes, the information display module 1120 is further configured to, in the case where the mail content of the target mail includes the sharer information, display the sharer information at a preset relative position of a position where subject information of the target mail is located.

Based on the preceding technical schemes, the information display module 1120 is further configured to generate a sharing mail prompt message according to the sharer information and perform message notification based on the sharing mail prompt message.

Based on the preceding technical schemes, an IM client of the sharee further includes a jumping module. The jumping module is configured to, in the case where a mail viewing operation triggered by the sharee based on the sharing mail prompt message is detected, jump to a mailbox client interface of the sharee to display the target mail.

Based on the preceding technical schemes, the information display module 1120 is further configured to display the sharer information in association with the displayed target mail in a mailbox client of the sharee.

Based on the preceding technical schemes, the mailbox client of the sharer further includes a sharer prompt information display module. The sharer prompt information display module is configured to display sharer prompt information on a mail display interface of the target mail after the target mail is shared.

Based on the preceding technical schemes, the information display module 1120 is further configured to display a second sharing identifier on a client interface of the sharee, where the second sharing identifier is used for characterizing that the target mail is shared from another client, and the second sharing identifier has a different display style from a first sharing identifier displayed by a client of the sharer.

The information display apparatus provided in the embodiments of the present disclosure may perform the information display method provided in any embodiment of the present disclosure and has corresponding functional modules for performing the information display method.

Each unit and module included in the embodiments of the information display apparatus are just divided according to functional logic, and the division is not limited to this, as long as the corresponding functions can be achieved. In addition, the name of the each functional unit is just intended for distinguishing and is not to limit the scope of the present disclosure.

Embodiment Thirteen

Figure 24:
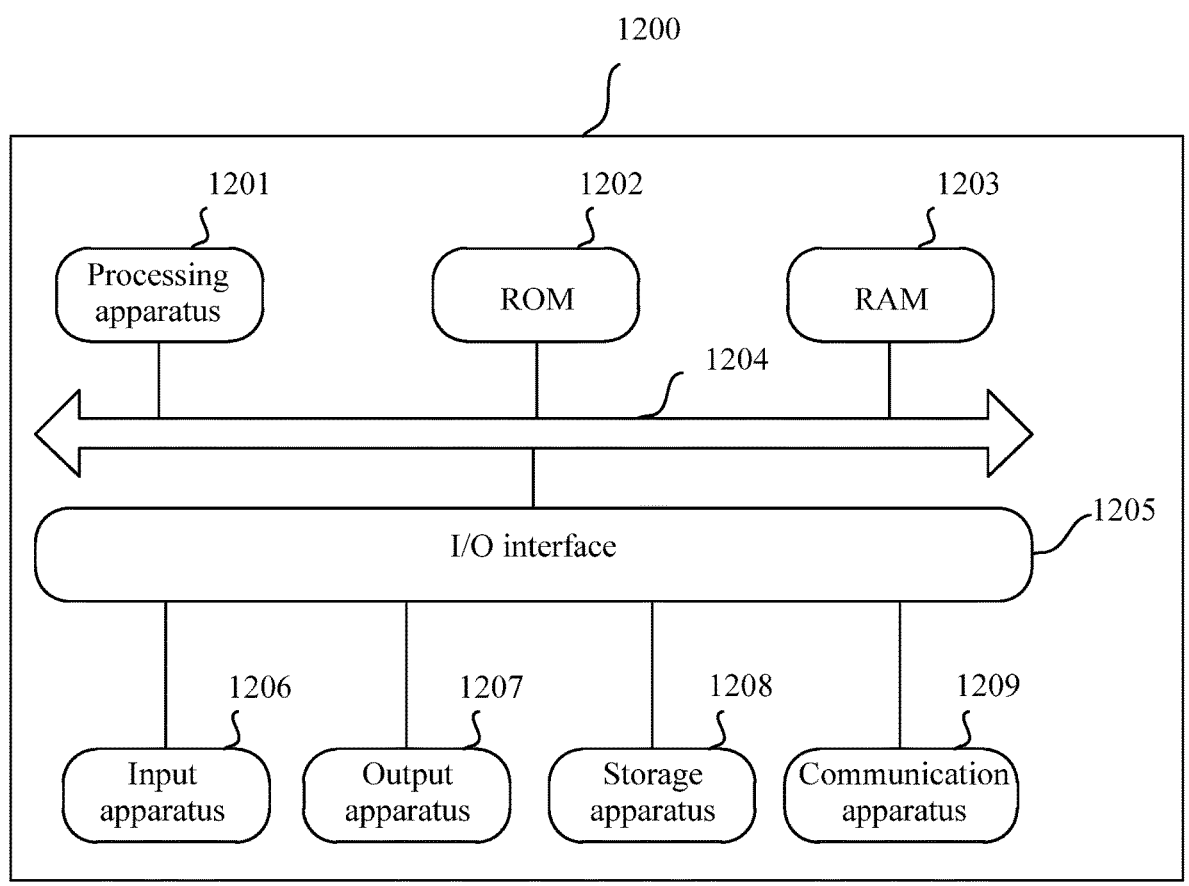
FIG. 24 is a structural diagram of an electronic device according to embodiment thirteen of the present disclosure.

Referring to FIG. 24, FIG. 24 is a structural diagram of an electronic device 1200 (such as a terminal device or server in FIG. 24) applicable to implement the embodiments of the present disclosure. The terminal device in the embodiments of the present disclosure may include, but is not limited to, mobile terminals such as a mobile phone, a laptop, a digital broadcast receiver, a personal digital assistant (PDA), a portable Android device (PAD), a portable multimedia player (PMP) and an in-vehicle terminal (such as an in-vehicle navigation terminal), and stationary terminals such as a digital television (TV) and a desktop computer. The electronic device shown in FIG. 24 is merely an example and is not intended to limit the function and usage scope of the embodiments of the present disclosure.

As shown in FIG. 24, the electronic device 1200 may include a processing apparatus 1201 (such as a central processing unit or a graphics processor). The electronic device 1200 may perform various appropriate actions and processing according to a program stored in a read-only memory (ROM) 1202 or a program loaded into a random-access memory (RAM) 1203 from a storage apparatus 1208. The RAM 1203 also stores various programs and data required for the operation of the electronic device 1200. The processing apparatus 1201, the ROM 1202, and the RAM 1203 are connected to each other through a bus 1204. An input/output (I/O) interface 1205 is also connected to the bus 1204.

Generally, the following apparatuses may be connected to the I/O interface 1205: an input apparatus 1206 such as a touch screen, a touchpad, a keyboard, a mouse, a camera, a microphone, an accelerometer, and a gyroscope; an output apparatus 1207 such as a liquid crystal display (LCD), a speaker, and a vibrator; the storage apparatus 1208 such as a magnetic tape and a hard disk; and a communication apparatus 1209. The communication apparatus 1209 may allow the electronic device 1200 to perform wireless or wired communication with other devices so as to exchange data. Although FIG. 24 shows the electronic device 1200 having various apparatuses, it is to be understood that not all the apparatuses shown herein need to be implemented or present. Alternatively, more or fewer apparatuses may be implemented or present.

According to the embodiments of the present disclosure, the process described above with reference to the flowchart may be implemented as a computer software program. For example, the embodiments of the present disclosure include a computer program product. The computer program product includes a computer program carried on a non-transitory computer-readable medium, and the computer program includes program codes for performing the method shown in the flowchart. In such an embodiment, the computer program may be downloaded from a network and installed through the communication apparatus 1209, or may be installed from the storage apparatus 1208, or may be installed from the ROM 1202. When the computer program is executed by the processing apparatus 1201, the preceding functions defined in the method of the embodiments of the present disclosure are performed.

The electronic device provided in the embodiment of the present disclosure and the information sharing method or the information display method provided in the preceding embodiments belong to the same concept, and for technical details not described in the embodiment of the present disclosure, reference may be made to the preceding embodiments.

Embodiment Fourteen

The embodiment of the present disclosure provides a computer storage medium. A computer program is stored on the computer storage medium. When the program is executed by a processor, the information sharing method provided in the preceding embodiments is implemented.

The computer-readable medium described above in the present disclosure may be a computer-readable signal medium or a computer-readable storage medium or any combination thereof. The computer-readable storage medium may be, but is not limited to, an electrical, magnetic, optical, electromagnetic, infrared, or semiconductor system, apparatus, or device, or any combination thereof. An example of the computer-readable storage medium may include, but is not limited to, an electrical connection having one or more wires, a portable computer magnetic disk, a hard disk, a RAM, a ROM, an erasable programmable read-only memory (EPROM), a flash memory, an optical fiber, a portable compact disc read-only memory (CD-ROM), an optical storage device, a magnetic storage device, or any suitable combination thereof. In the present disclosure, the computer-readable storage medium may be any tangible medium including or storing a program. The program may be used by or used in conjunction with an instruction execution system, apparatus, or device. In the present disclosure, the computer-readable signal medium may include a data signal propagated on a baseband or as a part of a carrier, and computer-readable program codes are carried in the computer-readable signal medium. The data signal propagated in this manner may be in multiple forms and includes, and is not limited to, an electromagnetic signal, an optical signal, or any suitable combination thereof. The computer-readable signal medium may further be any computer-readable medium other than the computer-readable storage medium. The computer-readable signal medium may send, propagate, or transmit a program used by or in conjunction with an instruction execution system, apparatus, or device. The program codes included in the computer-readable medium may be transmitted in any suitable medium, including, but not limited to, a wire, an optical cable, a radio frequency (RF), or any suitable combination thereof.

In some embodiments, clients and servers may communicate using any currently known or future developed network protocol, such as the HyperText Transfer Protocol (HTTP), and may be interconnected with any form or medium of digital data communication (for example, a communication network). Examples of the communication network include a local area network (LAN), a wide area networks (WAN), an internet (for example, the Internet), a peer-to-peer network (for example, an Ad-Hoc network), and any network currently known or to be developed in the future.

The computer-readable medium may be included in the electronic device or may exist alone without being assembled into the electronic device.

The preceding computer-readable medium carries one or more programs, and when executed by the electronic device, the one or more programs cause the electronic device to, in response to detecting a mail sharing operation triggered by a sharer for a first mail, determine, from a second mail matching the first mail, at least one target mail currently to be shared, where the second mail includes the first mail and/or another mail; and acquire sharee information and share, according to the sharee information, the at least one target mail with a sharee corresponding to the sharee information to display the target mail on a client interface corresponding to the sharee.

Alternatively, when executed by the electronic device, the one or more programs cause the electronic device to, in response to receiving a target mail shared by a sharer based on a mail sharing operation, acquire sharer information, and display the target mail and the sharer information on a client interface of a sharee.

Computer program codes for performing the operations in the present disclosure may be written in one or more programming languages or combination thereof. The preceding one or more programming languages include, but are not limited to, object-oriented programming languages such as Java, Smalltalk and C++, as well as conventional procedural programming languages such as C or similar programming languages. The program codes may be executed entirely on a user computer, partly on the user computer, as a stand-alone software package, partly on the user computer and partly on a remote computer, or entirely on the remote computer or a server. In the scenario involving the remote computer, the remote computer may be connected to the user computer through any type of network, including a local area network (LAN) or a wide area network (WAN), or the connection may be made to an external computer (for example, through the Internet using an Internet service provider).

The flowcharts and block diagrams in the drawings show possible architectures, functions and operations of the system, method and computer program product according to a plurality of embodiments of the present disclosure. In this regard, each block in a flowchart or block diagram may represent a module, a program segment, or part of codes that contains one or more executable instructions for implementing specified logical functions. In some alternative implementations, the functions marked in the blocks may occur in an order different from that marked in the drawings. For example, two successive blocks may in fact be executed substantially in parallel or in a reverse order, which depends on the functions involved. It is also to be noted that each block in the block diagrams and/or flowcharts and a combination of blocks in the block diagrams and/or flowcharts may be implemented by a specific-purpose hardware-based system which performs specified functions or operations or a combination of specific-purpose hardware and computer instructions.

The units involved in the embodiments of the present disclosure may be implemented by software or hardware. The name of a unit is not intended to limit the unit in a certain circumstance, for example, an editable content display unit may also be described as "an editing unit".

The functions described above herein may be performed, at least partially, by one or more hardware logic components. For example, without limitation, exemplary types of hardware logic components that may be used include a field-programmable gate array (FPGA), an application specific integrated circuit (ASIC), application specific standard product (ASSP), a system on a chip (SoC), and a complex programmable logic device (CPLD).

In the context of the present disclosure, a machine-readable medium may be a tangible medium that may include or store a program that is used by or in conjunction with an instruction execution system, apparatus, or device. The machine-readable medium may be a machine-readable signal medium or a machine-readable storage medium. The machine-readable medium may include, but is not limited to, an electronic, magnetic, optical, electromagnetic, infrared or semiconductor system, apparatus or device, or any suitable combination thereof. Examples of the machine-readable storage medium may include an electrical connection based on one or more wires, a portable computer disk, a hard disk, a RAM, a ROM, an EPROM, a flash memory, an optical fiber, a CD-ROM, an optical storage device, a magnetic storage device, or any suitable combination thereof.

According to one or more embodiments of the present disclosure, example one provides an information sharing method. The method includes in response to detecting a mail sharing operation triggered by a sharer for a first mail, determining at least one target mail currently to be shared; and acquiring sharee information and sharing, according to the sharee information, the at least one target mail with the sharee corresponding to the sharee information to display the target mail on a client interface corresponding to the sharee.

According to one or more embodiments of the present disclosure, example two provides an information sharing method. Optionally, the step of determining the target mail currently to be shared includes: determining, from a second mail matching the first mail, the target mail currently to be shared, where the second mail includes at least one of the first mail or another mail.

According to one or more embodiments of the present disclosure, example three provides an information sharing method. Optionally, the first mail includes a mail being edited, a received mail in an inbox, a sent mail in an outbox, or an edited mail stored in a draft box.

According to one or more embodiments of the present disclosure, example four provides an information sharing method. Optionally, the step of determining, from the second mail matching the first mail, the at least one target mail currently to be shared includes: in the case where the first mail is being edited, determining the first mail as the target mail currently to be shared; after the target mail is shared with the sharee corresponding to the sharee information to display the target mail on the client interface corresponding to the sharee, the method further includes: in response to detecting an edit operation performed by the sharer on the target mail, updating the target mail received in a client corresponding to the sharee according to current edited content of the sharer so that the sharee views the current edited content of the sharer based on the updated target mail.

According to one or more embodiments of the present disclosure, example five provides an information sharing method. Optionally, the step of determining, from the second mail matching the first mail, the at least one target mail currently to be shared includes: determining a first similarity between the first mail and an existing mail according to mail information of the first mail and mail information of the existing mail in a list of existing mails; determining, according to the first similarity, the second mail matching the first mail from the list of existing mails; and determining, from the second mail, the at least one target mail currently to be shared.

According to one or more embodiments of the present disclosure, example six provides an information sharing method. Optionally, the list of existing mails includes at least one of a list of received mails in an inbox, a list of sent mails in an outbox, or a list of edited mails in a draft box.

According to one or more embodiments of the present disclosure, example seven provides an information sharing method. Optionally, the step of determining the first similarity between the first mail and the existing mail according to the mail information of the first mail and the mail information of the existing mail in the list of existing mails includes: in the case where the first mail and the existing mail in the list of existing mails have the same subject information and the same sender and receiver information, determining the first similarity between the first mail and the existing mail as a preset value; and/or in the case where the first mail and the existing mail in the list of existing mails have the same subject information and a reference relationship exists between the existing mail and the first mail, determining the first similarity between the first mail and the existing mail as the preset value; the step of determining, according to the first similarity, the second mail matching the first mail from the list of existing mails includes determining the existing mail in the list of existing mails whose first similarity with the first mail is the preset value as the second mail matching the first mail.

According to one or more embodiments of the present disclosure, example eight provides an information sharing method. Optionally, after the at least one target mail is shared with the sharee corresponding to the sharee information to display the target mail on the client interface corresponding to the sharee, the method further includes: displaying a sharing success prompt identifier at a preset position of a first cell in a mailing list including the target mail, where the first cell is configured to display abbreviated information of the target mail.

According to one or more embodiments of the present disclosure, example nine provides an information sharing method. Optionally, the method further includes: in response to detecting a mail viewing operation triggered by the sharer for the target mail, deleting the displayed sharing success prompt identifier.

According to one or more embodiments of the present disclosure, example ten provides an information sharing method. Optionally, the step of determining, from the second mail matching the first mail, the at least one target mail currently to be shared includes: determining a target mail group where the first mail is located from a current mailbox, where mails matching each other in the current mailbox are stored in a form of a mail group; and determining, from the target mail group, the at least one target mail currently to be shared.

According to one or more embodiments of the present disclosure, example eleven provides an information sharing method. Optionally, after the at least one target mail is shared with the sharee corresponding to the sharee information to display the target mail on the client interface corresponding to the sharee, the method further includes: in response to a storage operation of a new mail in the target mail group, sharing the new mail stored in the target mail group with the sharee corresponding to the sharee information; and in response to a deletion operation of a shared mail in the target mail group, deleting the shared mail in the target mail shared with the sharee.

According to one or more embodiments of the present disclosure, example twelve provides an information sharing method. Optionally, the step of acquiring the sharee information and sharing, according to the sharee information, the at least one target mail with the sharee corresponding to the sharee information to display the target mail on the client interface corresponding to the sharee includes: acquiring sharee IM information in an IM client of the sharer; and sharing, according to the sharee IM information, the at least one target mail with the sharee corresponding to the sharee IM information to display the target mail on an IM client interface of the sharee.

According to one or more embodiments of the present disclosure, example thirteen provides an information sharing method. Optionally, after the at least one target mail currently to be shared is determined from the second mail matching the first mail, the method further includes: generating a mail card according to mail information of the target mail; the step of sharing the at least one target mail with the sharee corresponding to the sharee IM information to display the target mail on the IM client interface of the sharee includes: sending the mail card to an IM client of the sharee corresponding to the sharee IM information to display the mail card on the IM client interface of the sharee, and in response to detecting a mail viewing operation triggered for the mail card, displaying mail content of the target mail.

According to one or more embodiments of the present disclosure, example fourteen provides an information sharing method. Optionally, card display content of the mail card includes at least one of subject information of the target mail, text summary information of the target mail, or sharer information of the sharer.

According to one or more embodiments of the present disclosure, example fifteen provides an information sharing method. Optionally, the step of displaying the mail content of the target mail includes: creating a mail display window that is displayed on a same screen as an IM dialog window and displaying the mail content of the target mail in the mail display window.

According to one or more embodiments of the present disclosure, example sixteen provides an information sharing method. Optionally, the step of displaying the mail content of the target mail includes: displaying abbreviated information of the target mail in a form of a list; and in response to detecting a details viewing operation triggered for the abbreviated information, displaying detailed information of the target mail.

According to one or more embodiments of the present disclosure, example seventeen provides an information sharing method. Optionally, after the mail card is sent to the IM client of the sharee corresponding to the sharee IM information, the method further includes: in the case where the IM client of the sharer detects a message forwarding operation triggered by the sharer for the mail card, sending the mail card to an IM user or an IM user group selected by the sharer.

According to one or more embodiments of the present disclosure, example eighteen provides an information sharing method. Optionally, after the at least one target mail is shared with the sharee corresponding to the sharee IM information to display the target mail on the IM client interface of the sharee, the method further includes: acquiring state information of a target message in an IM session, where the target message includes a message sent by the sharer for the target mail or a message sent by the sharee for the target mail; and displaying, based on the state information of the target message, the state information on a mailbox client interface of the sharer and/or a mailbox client interface of the sharee.

According to one or more embodiments of the present disclosure, example nineteen provides an information sharing method. Optionally, the step of acquiring the state information of the target message in the IM session includes: acquiring information of an unread message based on whether the target message in the IM session is read by an information receiver; the step of displaying, based on the state information of the target message, the state information on the mailbox client interface of the sharer and/or mailbox client interface of the sharee includes: displaying the information of the unread message on the mailbox client interface of the sharer and/or the mailbox client interface of the sharee.

According to one or more embodiments of the present disclosure, example twenty provides an information sharing method. Optionally, the method further includes: acquiring sharee mailbox information; and sharing, according to the sharee mailbox information, the at least one target mail with a mailbox client of the sharee to display the target mail on the mailbox client interface of the sharee.

According to one or more embodiments of the present disclosure, example twenty-one provides an information sharing method. Optionally, the step of sharing, according to the sharee IM information, the at least one target mail with the sharee corresponding to the sharee IM information to display the target mail on the IM client interface of the sharee includes: sending, according to the sharee IM information, a sharing mail prompt message to an IM client of the sharee so that the sharee views the target mail in the mailbox client of the sharee based on the sharing mail prompt message.

According to one or more embodiments of the present disclosure, example twenty-two provides an information sharing method. Optionally, the step of acquiring the sharee information and sharing, according to the sharee information, the at least one target mail with the sharee corresponding to the sharee information to display the target mail on the client interface corresponding to the sharee includes: acquiring sharee mailbox information in a mailbox client of the sharer; and sharing, according to the sharee mailbox information, the at least one target mail with the sharee corresponding to the sharee mailbox information to display the target mail on a mailbox client interface of the sharee.

According to one or more embodiments of the present disclosure, example twenty-three provides an information sharing method. Optionally, after the at least one target mail is shared with the sharee corresponding to the sharee mailbox information to display the target mail on the mailbox client interface of the sharee, the method further includes that: the mailbox client of the sharer displays a first preset sharing identifier at a preset position of a first cell in a mailing list including the target mail, where the first cell is configured to display abbreviated information of the target mail; and a mailbox client of the sharee displays a second preset sharing identifier at a preset position of a second cell in the mailing list including the received target mail, where the second cell is configured to display the abbreviated information of the received target mail.

According to one or more embodiments of the present disclosure, example twenty-four provides an information sharing method. Optionally, the step of determining, from the second mail matching the first mail, the at least one target mail currently to be shared includes: displaying the second mail matching the first mail on a display interface; and determining the at least one target mail currently to be shared according to the second mail selected by the sharer on the display interface.

According to one or more embodiments of the present disclosure, example twenty-five provides an information sharing method. Optionally, after the at least one target mail is shared with the sharee corresponding to the sharee information to display the target mail on the client interface corresponding to the sharee, the method further includes: acquiring an identity of the sharee; and displaying the identity of the sharee on a mail display interface of the target mail in a mailbox client of the sharer.

According to one or more embodiments of the present disclosure, example twenty-six provides an information sharing method. The method further includes the following: optionally, the step of displaying the identity of the sharee on the mail display interface of the target mail in the mailbox client of the sharer includes: in the case where a number of sharees is less than or equal to a first preset number, displaying an identity of each sharee on the mail display interface of the target mail in the mailbox client of the sharer; and in the case where the number of the sharees is greater than the first preset number, displaying identities of the sharees on the mail display interface of the target mail in the mailbox client of the sharer based on a preset abbreviated display manner.

According to one or more embodiments of the present disclosure, example twenty-seven provides an information sharing method. Optionally, the step of displaying the identity of the sharee on the mail display interface of the target mail in the mailbox client of the sharer includes: detecting whether a mail viewing operation triggered by the sharee for the target mail exists; in the case where the mail viewing operation triggered by the sharee for the target mail does not exist, displaying the identity of the sharee on the mail display interface of the target mail in the mailbox client of the sharer in a first identifier display manner; and in the case where the mail viewing operation triggered by the sharee for the target mail exists, displaying the identity of the sharee from the first identifier display manner to a second identifier display manner.

According to one or more embodiments of the present disclosure, example twenty-eight provides an information sharing method. Optionally, after the at least one target mail is shared with the sharee corresponding to the sharee information to display the target mail on the client interface corresponding to the sharee, the method further includes: in response to detecting a sharee adding operation triggered by the sharer on a mail display interface of the target mail, acquiring information of a sharee to be added and sharing the at least one target mail with the sharee corresponding to the information of the sharee to be added according to the information of the sharee to be added.

According to one or more embodiments of the present disclosure, example twenty-nine provides an information sharing method. Optionally, mail content of the target mail displayed on the client interface corresponding to the sharee includes an attachment download link; the method further includes: in response to receiving an attachment download request sent by a client corresponding to the sharee for the attachment download link, performing identity authentication according to requester information in the attachment download request; and in response to detecting that the requester information satisfies a preset download condition, allowing an attachment download operation.

According to one or more embodiments of the present disclosure, example thirty provides an information sharing method. Optionally, mail content of the target mail displayed on the client interface corresponding to the sharee includes sharer prompt information, where the sharer prompt information is determined based on identity information of the sharer.

According to one or more embodiments of the present disclosure, example thirty-one provides an information sharing method. Optionally, after the at least one target mail is shared with the sharee corresponding to the sharee information to display the target mail on the client interface corresponding to the sharee, the method further includes: in response to detecting a sharing stop operation triggered by the sharer, sending a mail deletion instruction to a client corresponding to the sharee so that the client corresponding to the sharee deletes the received target mail based on the mail deletion instruction.

According to one or more embodiments of the present disclosure, example thirty-two provides an information sharing method. Optionally, after the at least one target mail is shared with the sharee corresponding to the sharee information to display the target mail on the client interface corresponding to the sharee, the method further includes: displaying a preset sharing identifier at a preset position of the target mail; or adding the currently shared target mail to a preset sharing box.

According to one or more embodiments of the present disclosure, example thirty-three provides an information sharing method. Optionally, the target mail includes multiple target mails; the step of adding the currently shared target mail to the preset sharing box includes: combining the multiple target mails currently shared into one shared mail group and adding the one shared mail group to the preset sharing box.

According to one or more embodiments of the present disclosure, example thirty-four provides an information sharing method. Optionally, before the at least one target mail is shared with the sharee corresponding to the sharee information to display the target mail on the client interface corresponding to the sharee, the method further includes: determining a mail processing authority corresponding to the sharee, where the mail processing authority includes at least one of the following: a mail editing authority, a mail viewing authority, a mail sending authority, or a secondary sharing authority.

According to one or more embodiments of the present disclosure, example thirty-five provides an information sharing method. Optionally, after the at least one target mail is shared with the sharee corresponding to the sharee information to display the target mail on the client interface corresponding to the sharee, the method further includes: in response to detecting an edit operation performed by a sharee with the mail editing authority on the target mail, updating, according to current edited content of the sharee with the mail editing authority, both the target mail in a client corresponding to the sharer and a target mail received in a client corresponding to another sharee so that the sharer and the another sharee view, based on the updated target mail, the current edited content of the sharee with the mail editing authority.

According to one or more embodiments of the present disclosure, example thirty-six provides an information sharing method. Optionally, the method further includes: in response to detecting a mail sending operation triggered by the sharer or a sharee with the mail sending authority for the updated target mails, sending, based on recipient mailbox information in the updated target mail, the updated target mail to a mailbox client corresponding to the recipient mailbox information.

According to one or more embodiments of the present disclosure, example thirty-seven provides an information sharing method. Optionally, the step of in response to detecting the mail sharing operation triggered by the sharer for the first mail, determining, from the second mail matching the first mail, the target mail currently to be shared includes: in response to detecting a mail sharing operation triggered by the sharer for a target mail group, determining a mail in the target mail group as the target mail currently to be shared.

According to one or more embodiments of the present disclosure, example thirty-eight provides an information sharing method. Optionally, the method further includes: in response to detecting that a newly-added mail exists in the target mail group, sharing the newly-added mail with the sharee corresponding to the sharee information.

According to one or more embodiments of the present disclosure, example thirty-nine provides an information sharing method. Optionally, after the target mail is shared with the sharee corresponding to the sharee information to display the target mail on the client interface corresponding to the sharee, the method further includes: displaying a first sharing identifier, where the first sharing identifier indicates that the target mail group is shared.

According to one or more embodiments of the present disclosure, example forty provides an information display method. Optionally, the method includes: in response to receiving a target mail shared by a sharer based on a mail sharing operation, acquiring sharer information; and displaying the target mail and the sharer information on a client interface of a sharee.

According to one or more embodiments of the present disclosure, example forty-one provides an information display method. Optionally, the step of displaying the target mail and the sharer information on the client interface of the sharee includes: generating mail sharing information according to mail information of the target mail and the sharer information; and displaying the mail sharing information on an IM client interface of the sharee.

According to one or more embodiments of the present disclosure, example forty-two provides an information display method. Optionally, after the mail sharing information is displayed on the IM client interface of the sharee, the method further includes: in response to detecting a mail viewing operation triggered for the mail sharing information, displaying mail content of the target mail.

According to one or more embodiments of the present disclosure, example forty-three provides an information display method. Optionally, card display content of the mail sharing information includes the sharer information of the sharer; and/or the mail content of the target mail includes the sharer information of the sharer.

According to one or more embodiments of the present disclosure, example forty-four provides an information display method. Optionally, card display content of the mail sharing information further includes at least one of subject information of the target mail or text summary information of the target mail.

According to one or more embodiments of the present disclosure, example forty-five provides an information display method. Optionally, the step of displaying the mail content of the target mail includes: in the case where the mail content of the target mail includes the sharer information, displaying the sharer information at a preset relative position of a position where subject information of the target mail is located.

According to one or more embodiments of the present disclosure, example forty-six provides an information display method. Optionally, the step of displaying the sharer information on the client interface of the sharee includes: generating a sharing mail prompt message according to the sharer information and performing message notification based on the sharing mail prompt message.

According to one or more embodiments of the present disclosure, example forty-seven provides an information display method. Optionally, the method further includes: in the case where an IM client of the sharee detects a mail viewing operation triggered by the sharee based on the sharing mail prompt message, jumping to a mailbox client interface of the sharee to display the target mail.

According to one or more embodiments of the present disclosure, example forty-eight provides an information display method. Optionally, the step of displaying the target mail and the sharer information on the client interface of the sharee includes: in a mailbox client of the sharee, displaying the sharer information in association with the displayed target mail.

According to one or more embodiments of the present disclosure, example forty-nine provides an information display method. Optionally, the method further includes: displaying sharer prompt information on a mail display interface of the target mail after a mailbox client of the sharer shares the target mail.

According to one or more embodiments of the present disclosure, example fifty provides an information display method. Optionally, the method further includes: displaying a second sharing identifier on a client interface of the sharee, where the second sharing identifier is used for characterizing that the target mail is shared from another client, and the second sharing identifier has a different display style from a first sharing identifier displayed by a client of the sharer.

According to one or more embodiments of the present disclosure, example fifty-one provides an information sharing apparatus. The apparatus includes a target mail determination module and a target mail sharing module. The target mail determination module is configured to, in response to detecting a mail sharing operation triggered by a sharer for a first mail, determine, from a second mail matching the first mail, at least one target mail currently to be shared, where the second mail includes the first mail and/or another mail. The target mail sharing module is configured to acquire sharee information and share, according to the sharee information, the at least one target mail with a sharee corresponding to the sharee information to display the target mail on a client interface corresponding to the sharee.

According to one or more embodiments of the present disclosure, example fifty-two provides an information display apparatus. The apparatus includes a sharer information acquisition module and an information display module. The sharer information acquisition module is configured to acquire sharer information in response to receiving a target mail shared by the sharer based on a mail sharing operation. The information display module is configured to display the target mail and the sharer information on a client interface of a sharee.

Although the operations are depicted in a particular order, this should not be construed as requiring that such operations should be performed in the particular order shown or in a sequential order. In certain circumstances, multitasking and parallel processing may be advantageous. Similarly, although implementation details are included in the preceding discussion, these should not be construed as limiting the scope of the present disclosure. Some features described in the context of separate embodiments may also be implemented in combination in a single embodiment. Various features described in the context of a single embodiment may also be implemented in a plurality of embodiments, individually or in any suitable sub-combination.

What is claimed is:

1. An information sharing method, comprising:
   in response to detecting a mail sharing operation triggered by a sharer for a first mail, determining, from a second mail matching the first mail, the target mail currently to be shared, wherein the second mail comprises at least one of the first mail or another mail; and
   acquiring sharee information and sharing, according to the sharee information, the target mail with a sharee corresponding to the sharee information to display the target mail on a client interface corresponding to the sharee,
   wherein the first mail comprises a mail being edited, a received mail in an inbox, a sent mail in an outbox, or an edited mail stored in a draft box;
   wherein determining, from the second mail matching the first mail, the target mail currently to be shared comprises:
   in a case where the first mail is the mail being edited, determining the first mail as the target mail currently to be shared; and
   wherein after sharing the target mail with the sharee corresponding to the sharee information to display the target mail on the client interface corresponding to the sharee, the method further comprises:
   in response to detecting an edit operation performed by the sharer on the target mail, updating, according to current edited content of the sharer, the target mail received in a client corresponding to the sharee so that the sharee views the current edited content of the sharer based on the updated target mail.

2. The method of claim 1, wherein determining, from the second mail matching the first mail, the target mail currently to be shared comprises:
   determining a first similarity between the first mail and an existing mail according to mail information of the first mail and mail information of the existing mail in a list of existing mails;
   determining, according to the first similarity, the second mail matching the first mail from the list of existing mails; and
   determining, from the second mail, the target mail currently to be shared;
   wherein the list of existing mails comprises at least one of the following: a list of received mails in an inbox, a list of sent mails in an outbox, or a list of edited mails in a draft box.

3. The method of claim 2, wherein determining the first similarity between the first mail and the existing mail according to the mail information of the first mail and the mail information of the existing mail in the list of existing mails comprises at least one of the following: in a case where the first mail and the existing mail in the list of existing mails have same subject information and same sender and receiver information, determining the first similarity between the first mail and the existing mail as a preset value; or in a case where the first mail and the existing mail in the list of existing mails have same subject information and a reference relationship exists between the existing mail and the first mail, determining the first similarity between the first mail and the existing mail as a preset value; and
   wherein determining, according to the first similarity, the second mail matching the first mail from the list of existing mails comprises: determining an existing mail in the list of existing mails whose first similarity with the first mail is the preset value as the second mail matching the first mail.

4. The method of claim 1, wherein after sharing the target mail with the sharee corresponding to the sharee information to display the target mail on the client interface corresponding to the sharee, the method further comprises:
   displaying a sharing success prompt identifier at a preset position of a first cell in a mailing list comprising the target mail;
   wherein the first cell is configured to display abbreviated information of the target mail.

5. The method of claim 1, wherein determining, from the second mail matching the first mail, the target mail currently to be shared comprises:
   determining, from a current mailbox, a target mail group where the first mail is located, wherein mails matching each other in the current mailbox are stored in a form of a mail group; and
   determining, from the target mail group, the target mail currently to be shared.

6. The method of claim 5, wherein after sharing the target mail with the sharee corresponding to the sharee information to display the target mail on the client interface corresponding to the sharee, the method further comprises:

in response to a storage operation of a new mail in the target mail group, sharing the new mail stored in the target mail group with the sharee corresponding to the sharee information; and in response to a deletion operation of a shared mail in the target mail group, deleting the shared mail in the target mail shared with the sharee.

7. The method of claim 1, wherein acquiring the sharee information and sharing, according to the sharee information, the target mail with the sharee corresponding to the sharee information to display the target mail on the client interface corresponding to the sharee comprises:

acquiring sharee instant messaging (IM) information in an IM client of the sharer; and sharing, according to the sharee IM information, the target mail with a sharee corresponding to the sharee IM information to display the target mail on an IM client interface of the sharee.

8. The method of claim 7, wherein after determining, from the second mail matching the first mail, the target mail currently to be shared, the method further comprises:

generating a mail card according to mail information of the target mail; and wherein sharing the target mail with the sharee corresponding to the sharee IM information to display the target mail on the IM client interface of the sharee comprises:

sending the mail card to an IM client of the sharee corresponding to the sharee IM information to display the mail card on the IM client interface of the sharee, and in response to detecting a mail viewing operation triggered for the mail card, displaying mail content of the target mail;

wherein card display content of the mail card comprises at least one of the following:

subject information of the target mail, text summary information of the target mail, or sharer information of the sharer.

9. The method of claim 8, wherein displaying the mail content of the target mail comprises:

creating a mail display window that is displayed on a same screen as an IM dialog window and displaying the mail content of the target mail in the mail display window; or wherein displaying the mail content of the target mail comprises:

displaying abbreviated information of the target mail in a form of a list; and in response to detecting a details viewing operation triggered for the abbreviated information, displaying detailed information of the target mail.

10. The method of claim 8, wherein after sending the mail card to the IM client of the sharee corresponding to the sharee IM information, the method further comprises:

in a case where the IM client of the sharer detects a message forwarding operation triggered by the sharer for the mail card, sending the mail card to at least one of an IM user or an IM user group selected by the sharer.

11. The method of claim 7, wherein after sharing the target mail with the sharee corresponding to the sharee IM information to display the target mail on the IM client interface of the sharee, the method further comprises:

acquiring state information of a target message in an IM session, wherein the target message comprises a message sent by the sharer for the target mail or a message sent by the sharee for the target mail; and displaying, based on the state information of the target message, the state information on at least one of a mailbox client interface of the sharer or a mailbox client interface of the sharee; and wherein acquiring the state information of the target message in the IM session comprises:

acquiring information of an unread message based on whether the target message in the IM session is read by an information receiver; and wherein displaying, based on the state information of the target message, the state information on the at least one of the mailbox client interface of the sharer or the mailbox client interface of the sharee comprises:

displaying the information of the unread message on the at least one of the mailbox client interface of the sharer or the mailbox client interface of the sharee.

12. The method of claim 7, further comprising:

acquiring sharee mailbox information of the sharee; and sharing, according to the sharee mailbox information, the target mail with a mailbox client of the sharee to display the target mail on the mailbox client interface of the sharee;

wherein sharing, according to the sharee IM information, the target mail with the sharee corresponding to the sharee IM information to display the target mail on the IM client interface of the sharee comprises:

sending, according to the sharee IM information, a sharing mail prompt message to an IM client of the sharee so that the sharee views the target mail in the mailbox client of the sharee based on the sharing mail prompt message.

13. The method of claim 1, wherein acquiring the sharee information and sharing, according to the sharee information, the target mail with the sharee corresponding to the sharee information to display the target mail on the client interface corresponding to the sharee comprises:

acquiring sharee mailbox information in a mailbox client of the sharer; and sharing, according to the sharee mailbox information, the target mail with a sharee corresponding to the sharee mailbox information to display the target mail on a mailbox client interface of the sharee.

14. The method of claim 13, wherein after sharing the target mail with the sharee corresponding to the sharee mailbox information to display the target mail on the mailbox client interface of the sharee, the method further comprises:

displaying, by the mailbox client of the sharer, a first preset sharing identifier at a preset position of a first cell in a mailing list comprising the target mail, wherein the first cell is configured to display abbreviated information of the target mail; and displaying, by a mailbox client of the sharee, a second preset sharing identifier at a preset position of a second cell in a mailing list comprising the received target mail, wherein the second cell is configured to display the abbreviated information of the received target mail.

15. The method of claim 1, wherein determining, from the second mail matching the first mail, the target mail currently to be shared comprises:

displaying the second mail matching the first mail on a display interface; and determining the target mail currently to be shared according to the second mail selected by the sharer on the display interface.

16. The method of claim 1, wherein after sharing the target mail with the sharee corresponding to the sharee information to display the target mail on the client interface corresponding to the sharee, the method further comprises:
  acquiring an identity of the sharee; and
    displaying the identity of the sharee on a mail display interface of the target mail in a mailbox client of the sharer.

17. The method of claim 1, wherein after sharing the target mail with the sharee corresponding to the sharee information to display the target mail on the client interface corresponding to the sharee, the method further comprises:
  in response to detecting a sharee adding operation triggered by the sharer on a mail display interface of the target mail, acquiring information of a sharee to be added and sharing, according to the information of the sharee to be added, the target mail with the sharee corresponding to the information of the sharee to be added.

18. The method of claim 1, wherein mail content of the target mail displayed on the client interface corresponding to the sharee comprises an attachment download link; and
  wherein the method further comprises:
    in response to receiving an attachment download request sent by a client corresponding to the sharee for the attachment download link, performing identity authentication according to requester information in the attachment download request; and
    in response to detecting that the requester information satisfies a preset download condition, allowing an attachment download operation.

19. The method of claim 1, wherein mail content of the target mail displayed on the client interface corresponding to the sharee comprises sharer prompt information, wherein the sharer prompt information is determined based on identity information of the sharer.

20. The method of claim 1, wherein after sharing the target mail with the sharee corresponding to the sharee information to display the target mail on the client interface corresponding to the sharee, the method further comprises:
  in response to detecting a sharing stop operation triggered by the sharer, sending a mail deletion instruction to a client corresponding to the sharee so that the client corresponding to the sharee deletes the received target mail based on the mail deletion instruction.

21. The method of claim 1, wherein after sharing the target mail with the sharee corresponding to the sharee information to display the target mail on the client interface corresponding to the sharee, the method further comprises:
  displaying a preset sharing identifier at a preset position of the target mail; or
  adding the currently shared target mail to a preset sharing box.

22. The method of claim 1, wherein before sharing the target mail with the sharee corresponding to the sharee information to display the target mail on the client interface corresponding to the sharee, the method further comprises:
  determining a mail processing authority corresponding to the sharee, wherein the mail processing authority comprises at least one of the following: a mail editing authority, a mail viewing authority, a mail sending authority, or a secondary sharing authority.

23. An information sharing apparatus, comprising: at least one processor, and a memory, which is configured to store at least one program; wherein the at least one program, when executed by the at least one processor, causes the at least one processor to perform the information sharing method of claim 1.

24. A non-transitory computer-readable storage medium storing a computer program, wherein the computer program, when executed by a processor, causes the processor to perform the information sharing method of claim 1.

25. An information display method, comprising:
  in response to receiving a target mail shared by a sharer based on a mail sharing operation, acquiring sharer information of the sharer, wherein the target mail is determined from a second mail matching a first mail, the first mail is a mail displayed on a client interface corresponding to the sharer, and the first mail comprises a mail being edited, a received mail in an inbox, a sent mail in an outbox, or an edited mail stored in a draft box; and
  displaying the target mail and the sharer information on a client interface of a sharee;
  wherein the method further comprises:
  displaying sharer prompt information on a mail display interface of the target mail after a mailbox client of the sharer shares the target mail;
  wherein displaying the target mail and the sharer information on the client interface of the sharee comprises:
  generating mail sharing information according to mail information of the target mail and the sharer information; and
  displaying the mail sharing information on an instant messaging (IM) client interface of the sharee, and
  wherein after displaying the mail sharing information on the IM client interface of the sharee, the method further comprises:
  in response to detecting an edit operation performed by the sharer on the target mail, updating, according to current edited content of the sharer, the target mail received in a client corresponding to the sharee so that the sharee views the current edited content of the sharer based on the updated target mail.

26. The method of claim 25, wherein after displaying the mail sharing information on the IM client interface of the sharee, the method further comprises:
  in response to detecting a mail viewing operation triggered for the mail sharing information, displaying mail content of the target mail;
  wherein at least one of the following is satisfied:
    display content of the mail sharing information comprises the sharer information of the sharer; or
    the mail content of the target mail comprises the sharer information of the sharer; and
  wherein displaying the mail content of the target mail comprises:
  in a case where the mail content of the target mail comprises the sharer information of the sharer, displaying the sharer information of the sharer at a preset relative position of a position where subject information of the target mail is located.

27. The method of claim 25, further comprising:
  displaying a second sharing identifier on a client interface of the sharee, wherein the second sharing identifier is used for characterizing that the target mail is shared from another client, and the second sharing identifier has a different display style from a first sharing identifier displayed by a client of the sharer.

28. An information display apparatus, comprising: at least one processor, and a memory, which is configured to store at least one program; wherein the at least one program, when executed by the at least one processor, causes the at least one processor to perform the information display method of claim 25.

* * * * *